(12) United States Patent
Takahashi et al.

(10) Patent No.: US 8,312,713 B2
(45) Date of Patent: Nov. 20, 2012

(54) INTERNAL COMBUSTION ENGINE, VEHICLE, MARINE VESSEL, AND EXHAUSTING METHOD FOR INTERNAL COMBUSTION ENGINE

(75) Inventors: Yusuke Takahashi, Shizuoka (JP); Tsugunori Konakawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 310 days.

(21) Appl. No.: 12/669,808

(22) PCT Filed: Jun. 15, 2009

(86) PCT No.: PCT/JP2009/060853
§ 371 (c)(1),
(2), (4) Date: Jan. 20, 2010

(87) PCT Pub. No.: WO2009/151135
PCT Pub. Date: Dec. 17, 2009

(65) Prior Publication Data
US 2010/0180583 A1    Jul. 22, 2010

(30) Foreign Application Priority Data

Jun. 13, 2008   (JP) .................................. 2008-155070

(51) Int. Cl.
*F01N 1/02*    (2006.01)
*F01N 1/08*    (2006.01)
*F01N 3/00*    (2006.01)
*F01N 3/02*    (2006.01)
*F02B 27/02*   (2006.01)

(52) U.S. Cl. ................ 60/311; 60/312; 60/313; 60/314; 60/324; 60/274; 181/250; 181/266; 181/273; 181/276

(58) Field of Classification Search .................... 60/273, 60/297, 295, 311–314; 181/250, 266, 273, 181/276
See application file for complete search history.

(56) References Cited

U.S. PATENT DOCUMENTS 2,118,209 A * 5/1938 Linthwaite ....................... 440/78
2,297,046 A * 9/1942 Bourne ........................... 181/250
(Continued)

FOREIGN PATENT DOCUMENTS
DE        946 930 C      8/1956
(Continued)

OTHER PUBLICATIONS

JP1-76520U, (one page).*

(Continued)

*Primary Examiner* — Thomas Denion
*Assistant Examiner* — Anthony Ayala Delgado
(74) *Attorney, Agent, or Firm* — Keating & Bennett, LLP

(57) ABSTRACT

An internal combustion engine includes a structure that increases the velocity of exhaust gas. The internal combustion engine includes a branch section arranged to branch a shock wave propagating at a higher velocity than exhaust gas and to guide the branched shock wave, and a reflecting section provided in the branch section. The reflecting section is arranged to reflect and return the shock wave back to an exhaust path and cause the shock wave to collide against the exhaust gas, thereby increasing the pressure of the exhaust gas. In accompaniment with the exhaust gas passing a divergent section of a convergent-divergent nozzle, a new shock wave propagating in a downstream direction in the exhaust path is generated, and the temperature and pressure of the exhaust gas are decreased.

10 Claims, 16 Drawing Sheets

U.S. PATENT DOCUMENTS

| | | | | |
|---|---|---|---|---|
| 3,116,596 | A | * | 1/1964 | Voris et al. .................. 60/307 |
| 3,254,484 | A | * | 6/1966 | Kopper ........................ 60/275 |
| 3,563,030 | A | * | 2/1971 | Lentz et al. .................. 60/288 |
| 3,655,011 | A | * | 4/1972 | Willett ........................ 181/228 |
| 4,094,284 | A | * | 6/1978 | Gesell ......................... 123/444 |
| 4,660,378 | A | | 4/1987 | Scharpf |
| 5,216,883 | A | | 6/1993 | Flugger |
| 5,732,555 | A | * | 3/1998 | Gracyalny et al. .......... 60/299 |
| 6,568,359 | B2 | * | 5/2003 | Pischinger et al. ....... 123/90.11 |
| 2002/0152747 | A1 | | 10/2002 | Blair et al. |
| 2008/0022671 | A1 | * | 1/2008 | Konakawa et al. .......... 60/313 |
| 2008/0093162 | A1 | * | 4/2008 | Marocco et al. ............ 181/250 |

FOREIGN PATENT DOCUMENTS

| | | |
|---|---|---|
| JP | 61-155620 A | 7/1986 |
| JP | 61-212629 A | 9/1986 |
| JP | 62-58017 A | 3/1987 |
| JP | 01-076520 U | 5/1989 |
| JP | 2004-150310 A | 5/2004 |
| JP | 2008-031868 A | 2/2008 |
| WO | 02/064955 A1 | 8/2002 |

OTHER PUBLICATIONS

Official Communication issued in International Patent Application No. PCT/JP2009/060853, mailed on Sep. 15, 2009.

Takahashi et al.; "Internal Combustion Engine, Vehicle, Marine Vessel, and Secondary Air Supply Method for Internal Combustion Engine"; U.S. Appl. No. 12/669,809; filed Jan. 20, 2010.

Takahashi et al.; "Internal Combustion Engine, Vehicle, Marine Vessel, and Exhaust Gas Cleaning Method for Internal Combustion Engine"; U.S. Appl. No. 12/669,810; filed Jan. 20, 2010.

Takahashi et al.; "Multi-Cylinder Internal Combustion Engine, Vehicle, Marine Vessel, and Exhausting Method for Multi-Cylinder Internal Combustion Engine"; U.S. Appl. No. 12/669,811; filed Jan. 20, 2010.

Official Communication issued in corresponding European Patent Application No. 09 75 6231, completed on Jan. 3, 2011.

* cited by examiner

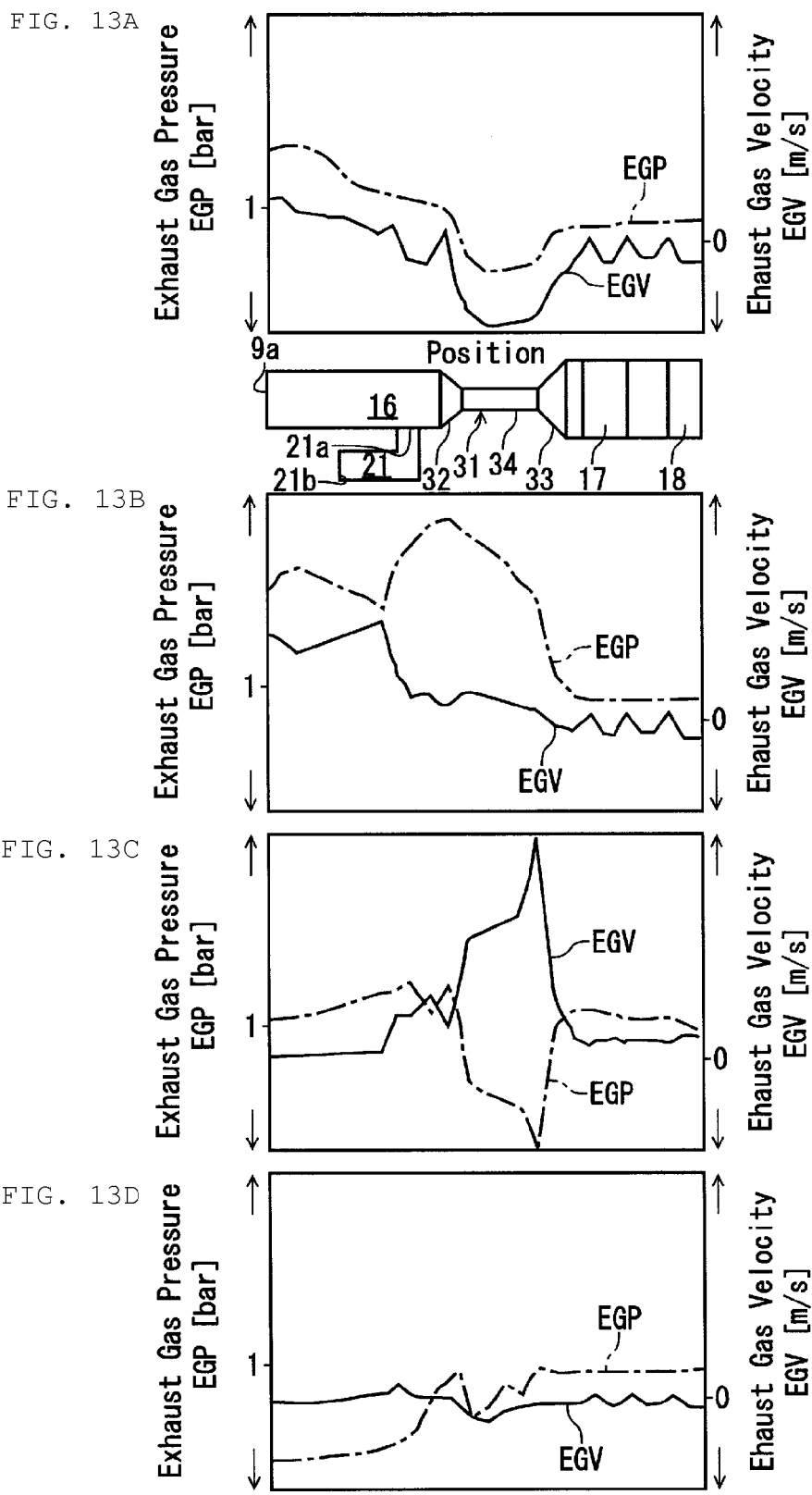

INTERNAL COMBUSTION ENGINE, VEHICLE, MARINE VESSEL, AND EXHAUSTING METHOD FOR INTERNAL COMBUSTION ENGINE

BACKGROUND OF THE INVENTION

1. Field of the Invention

The present invention relates to an internal combustion engine, a vehicle, a marine vessel, and an exhausting method for an internal combustion engine.

2. Description of the Related Art

Conventionally, in order to enhance the performance of internal combustion engines, gas exhaust devices of the internal combustion engines have been improved. For example, as described in Japanese Laid-Open Utility Model Publication No. 1-76520, an internal combustion engine including a convergent-divergent nozzle (generally called "de Laval nozzle") has been proposed in order to enhance the scavenging efficiency. The nozzle includes a convergent section having a flow path cross-sectional area which is decreased as a fluid progresses, a divergent section provided downstream with respect to the convergent section and having a flow path cross-sectional area which increases as the fluid progresses, and a throat section provided between the convergent section and the divergent section. When the pressure ratio of the pressure P0 in the convergent section and the pressure P in the divergent section (i.e., P/P0) is smaller than the critical pressure ratio (for air, about 0.528), the velocity of the fluid exceeds the sonic velocity in the divergent section. Japanese Laid-Open Utility Model Publication No. 1-76520 has an object of improving the scavenging efficiency using this function of this nozzle. Specifically, as shown in FIG. 1 of Japanese Laid-Open Utility Model Publication No. 1-76520, six exhaust ports of the inline six-cylinder internal combustion engine are merged together into an exhaust merging pipe. In addition, the exhaust path thereof is set to have a length that increases the scavenging efficiency, and the nozzle is provided at the exhaust outlet of the exhaust merging pipe. Japanese Laid-Open Utility Model Publication No. 1-76520 describes that the exhaust gas flow, which has passed the nozzle and thus is increased in velocity, absorbs the exhaust gas remaining in the exhaust merging pipe, and thus the scavenging efficiency can be improved.

SUMMARY OF THE INVENTION

The present inventors have studied internal combustion engines using the function of a convergent-divergent nozzle as described in Japanese Laid-Open Utility Model Publication No. 1-76520. While studying the internal combustion engines, the present inventors discovered that when the velocity of exhaust gas is increased to the sonic velocity to generate a shock wave, the pressure in a region upstream with respect to the shock wave is decreased. The present inventors conceived of enhancing the performance of an internal combustion engine by generating a negative pressure in the exhaust path using such a decrease of the pressure in the region upstream with respect to the shock wave. However, as a result of actively studying Japanese Laid-Open Utility Model Publication No. 1-76520, the present inventors discovered that even if the velocity of the exhaust gas becomes high due to the action of the convergent-divergent nozzle, a negative pressure cannot be generated in a portion of the exhaust merging pipe which is upstream with respect to the nozzle for the following reasons. The internal combustion engine described in Japanese Laid-Open Utility Model Publication No. 1-76520 is a six-cylinder internal combustion engine and explodes every 120 degrees of the crank angle. Therefore, a pressure wave is generated in the exhaust path at an interval of 120 degrees. In general, the angle at which the exhaust port of an internal combustion engine is opened (work angle) is about 240 degrees. In the internal combustion engine described in Japanese Laid-Open Utility Model Publication No. 1-76520, the ports of the cylinders are merged into one convergent-divergent nozzle at a position upstream with respect thereto. Therefore, while the exhaust port of one cylinder is opened, the exhaust port of at least one of the remaining cylinders is opened. Before the exhaust port of one cylinder is closed, the exhaust port of the cylinder in which the next explosion is to occur is opened and the next pressure wave is generated. For this reason, the inside of the exhaust merging pipe is always in a positive pressure state. Even if the pressure ratio of the pressure P0 in the convergent section and the pressure P in the divergent section (i.e., P/P0) is decreased to be lower than the critical pressure ratio and the velocity of the exhaust gas exceeds the sonic velocity in the divergent section, the inside of the exhaust merging pipe always stays in the positive pressure state. As a result, the performance of the internal combustion engine cannot be expected to be fully improved.

In light of such circumstances, preferred embodiments of the present invention provide a novel internal combustion engine offering improved performance by applying the principle of the convergent-divergent nozzle.

In view of the above problems, it was conceived of to connect the divergent section to the only one combustion chamber which is provided upstream with respect thereto. As a result of this arrangement, it is made impossible that while the exhaust port of one cylinder is opened, a pressure wave generated in the exhaust port of another cylinder propagates to the exhaust path connected to the exhaust port which has been opened. Therefore, a positive pressure and a negative pressure are alternately generated in a portion of the exhaust path which is upstream with respect to the divergent section. However, it was discovered that with this structure, a large negative pressure cannot be generated in the exhaust path for the following reasons and due to the following problems. One problem is that a shock wave generated when the exhaust port in the combustion chamber is opened is attenuated before reaching an upstream end of the divergent section. Another problem is that the pressure of the exhaust gas flowing in the exhaust path with a delay with respect to the shock wave is attenuated before the exhaust gas reaches the upstream end of the divergent section. For these reasons, even if either the shock wave or the exhaust gas reaches the upstream end of the divergent section, the pressure ratio of the pressure P0 in the convergent section and the pressure P in the divergent section does not become smaller than the critical pressure ratio. Therefore, the velocity of the fluid passing the exhaust path does not exceed the sonic velocity, and thus the function of the convergent-divergent nozzle cannot be obtained.

An internal combustion engine according to a preferred embodiment of the present invention includes a combustion chamber including an exhaust port, an exhaust valve arranged to open or close the exhaust port, and an exhaust device including an exhaust path arranged to guide exhaust gas discharged from the combustion chamber via the exhaust port. The exhaust device includes a convergent section having a flow path cross-sectional area that is smaller at a downstream end thereof than at an upstream end thereof, a divergent section provided downstream with respect to the convergent section and having a flow path cross-sectional area that is larger at a downstream end thereof than at an upstream end thereof, and a branch section arranged to branch a shock wave, propagating in a downstream direction in the exhaust path at a higher velocity than the exhaust gas flowing into the exhaust path from the combustion chamber when the exhaust valve is opened, from a portion of the exhaust path which is upstream with respect to the divergent section, and propagating the branched shock wave back to the exhaust path. The divergent section is connected to the only one combustion chamber provided upstream with respect to the divergent section. The exhaust gas flowing into the exhaust path from the combustion chamber is caused to pass the convergent section and to collide against the shock wave which has propagated in the branch section, between the branch section and the divergent section, thus to increase the pressure of the exhaust gas in the convergent section. The exhaust gas is caused to pass the divergent section to generate a new shock wave, and a negative pressure is generated upstream with respect to the divergent section in the exhaust path by the generated new shock wave.

According to a preferred embodiment of the present invention, the divergent section is connected to only one combustion chamber provided upstream with respect thereto, and also the branch section is provided in a portion of the exhaust path which is upstream with respect to the divergent section. As a result, the shock wave propagating in the exhaust pipe at a higher velocity than the exhaust gas flowing from the combustion chamber into the exhaust path when the exhaust port is opened is branched from the portion of the exhaust path which is upstream with respect to the divergent section, is propagated back to the exhaust path after being delayed in the branch section, and is caused to collide against the exhaust gas flowing with a delay. Therefore, the pressure of the exhaust gas is increased. In addition, since the exhaust gas is caused to pass the divergent section, the pressure of the exhaust gas is increased. Since the exhaust gas is caused to pass the divergent section, a new shock wave propagating in a downstream direction is generated. Since a positive pressure and a negative pressure are alternately generated in the portion of the exhaust path which is upstream with respect to the divergent section and also the pressure upstream with respect to the new shock wave is decreased, a large negative pressure is generated in the portion of the exhaust path which is upstream with respect to the divergent section. This can improve the performance of the internal combustion engine.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 4A-4C are cross-sectional views of the exhaust path and the like showing the progressing state of a shock wave and exhaust gas wherein FIG. 4A shows an initial state of an exhaust stroke, FIG. 4B shows a state where the shock wave propagates to a branch section, and FIG. 4C shows a state where the shock wave reflected by the branch section collides against the exhaust gas.

FIGS. 9A and 9B are P-V diagrams representing the pumping loss, wherein FIG. 9A shows a P-V diagram of a conventional internal combustion engine, and FIG. 9B shows a P-V diagram of an internal combustion engine according to a preferred embodiment of the present invention.

FIGS. 13A-13D show the relationship between the exhaust gas velocity and the exhaust gas pressure in time sequence.

DETAILED DESCRIPTION OF THE PREFERRED EMBODIMENTS

As a result of active studies, the present inventors conceived of an idea that a large negative pressure can be generated in the exhaust path by applying the principle of the convergent-divergent nozzle and using the following novel method not conventionally known. The present inventors found that this novel method can improve the performance of an internal combustion engine.

The novel method is as follows. (1) A shock wave preceding the exhaust gas is branched; (2) The branched shock wave is delayed such that the shock wave collides against the exhaust gas, thereby increasing the pressure of the exhaust gas; (3) The exhaust gas having the increased pressure is caused to pass the divergent section to be accelerated to an ultrasonic velocity, thereby generating a shock wave; and (4) A negative pressure is generated in a portion of the exhaust path which is upstream with respect to the divergent section.

Preferred Embodiment 1

Hereinafter, an internal combustion engine according to a preferred embodiment of the present invention will be described in detail with reference to the drawings. In the following description, the terms "upstream" and "downstream" respectively refer to upstream and downstream with respect to the direction in which a fluid such as exhaust gas or the like flows.

Figure 1:
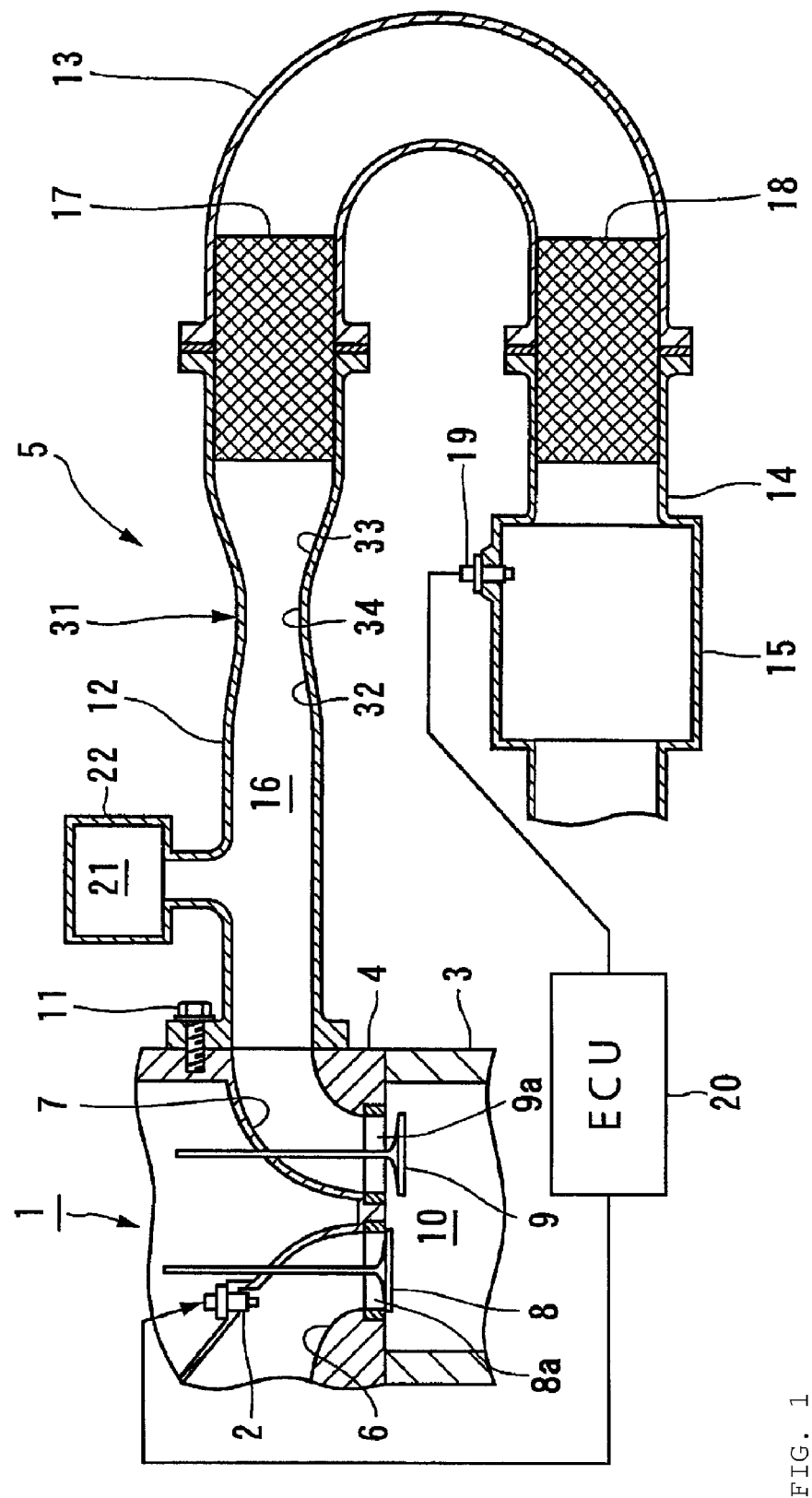
FIG. 1 shows a structure of an exhaust device of an internal combustion engine according to Preferred Embodiment 1, and is a cross-sectional view of an exhaust path and the like thereof.

As shown in FIG. 1, an internal combustion engine 1 includes a cylinder body 3 and a cylinder head 4. In the cylinder body 3 and the cylinder head 4, a combustion chamber 10 is provided. The internal combustion engine 1 preferably is a four-cycle gasoline engine, for example. The internal combustion engine 1 may be of an air-cooled type or of a water-cooled type, for example. The cylinder head 4 has a downstream section 6 of an intake path and an upstream section 7 of an exhaust path 16 formed therein. The cylinder head 4 accommodates an intake valve 8 arranged to open or close an intake port 8a, an exhaust valve 9 arranged to open or close an exhaust port 9a, a valve driving mechanism (not shown) arranged to drive the intake valve 8 and the exhaust valve 9, and the like. In this preferred embodiment, one, downstream section 6 of the intake path and one upstream section 7 of the exhaust path preferably are provided for one combustion chamber 10, for example. Alternatively, a plurality of intake ports 8a, a plurality of exhaust ports 9a, a plurality of intake valves 8, a plurality of exhaust valves 9, a plurality of downstream sections 6 of the intake path and a plurality of upstream sections 7 of the exhaust path may be provided for one combustion chamber. An injector 2 arranged to inject fuel is attached to the cylinder head 4. Although not shown, the cylinder 4 is also preferably provided with an ignition plug.

Although not shown, a throttle valve is preferably located inside the intake path. The throttle valve is operable manually or electronically controllable.

An exhaust device 5 includes a first exhaust pipe 12, a second exhaust pipe 13, a third exhaust pipe 14, and an exhaust chamber 15, which are sequentially connected in this order from an upstream position toward a downstream position. The exhaust device 5 has the exhaust path 16 located therein. The first exhaust pipe 12 is attached to the cylinder head 4 via an attaching bolt 11, for example. The second exhaust pipe 13 is connected to a downstream end of the first exhaust pipe 12. The third exhaust pipe 14 is connected to a downstream end of the second exhaust pipe 13. The third exhaust pipe 14 and the exhaust chamber 15 are preferably integrally formed.

Inside the exhaust device 5, a first catalyst 17 and a second catalyst 18 are provided. The second catalyst 18 is located downstream with respect to the first catalyst 17. The first catalyst 17 and the second catalyst 18 have a space disposed therebetween.

A muffler (not shown) is connected to a downstream end of the exhaust chamber 15. Exhaust gas which flows into the inside of the exhaust chamber 15 passes the muffler and then is discharged outside. The exhaust chamber 15 is provided with an oxygen concentration sensor 19 to detect an amount of oxygen in the exhaust gas.

An ECU 20, which is a control device, controls the amount of fuel to be injected from the injector 2, the time to cause the ignition plug to ignite or the like, based on the rotational speed of the internal combustion engine 1, the opening angle of the throttle valve, the amount of oxygen in the exhaust gas detected by the oxygen concentration sensor 19 or the like, for example. In this preferred embodiment, the ECU 20 controls the amount of fuel to be injected from the injector 2 such that, for example, the air/fuel ratio of the mixed gas to be absorbed into the internal combustion engine 1 is the theoretical air/fuel ratio.

The exhaust device 5 includes a branch pipe 22. The branch pipe 22 has a branch section 21 provided therein. One end of the branch pipe 22 is connected to the exhaust path 16, and the other end of the branch pipe 22 is closed. The closed end of the branch pipe 22 acts as a reflecting section to reflect a shock wave described later. In this preferred embodiment, the branch pipe 22 is preferably integrally formed with the first exhaust pipe 12. Alternatively, the branch pipe 22 may be formed separately from, and fixed to, the first exhaust pipe 12. For example, the first exhaust pipe 12 and the branch pipe 22 may be welded together or fixed to each other via a tightening member (not shown) such as a bolt or the like. The branch section 21 preferably includes a larger flow path cross-sectional area at the closed end than at the end thereof connected to the exhaust path 16, but the shape of the branch section 21 is not limited to that shown in FIG. 1. For example, the branch section 21 may have a chamber shape as shown in FIG. 1, may have a pipe shape having a constant flow path cross-sectional area and having a closed tip, or may have a shape having a smaller flow path cross-sectional area at the closed end than at the end connected to the exhaust path. An entrance of the branch section 21 (i.e., the portion connected to the exhaust path 16) is sized so as to allow the shock wave propagating in the exhaust path 16 to be branched to, and propagate in, the branch section 21 as described later.

Figure 2:
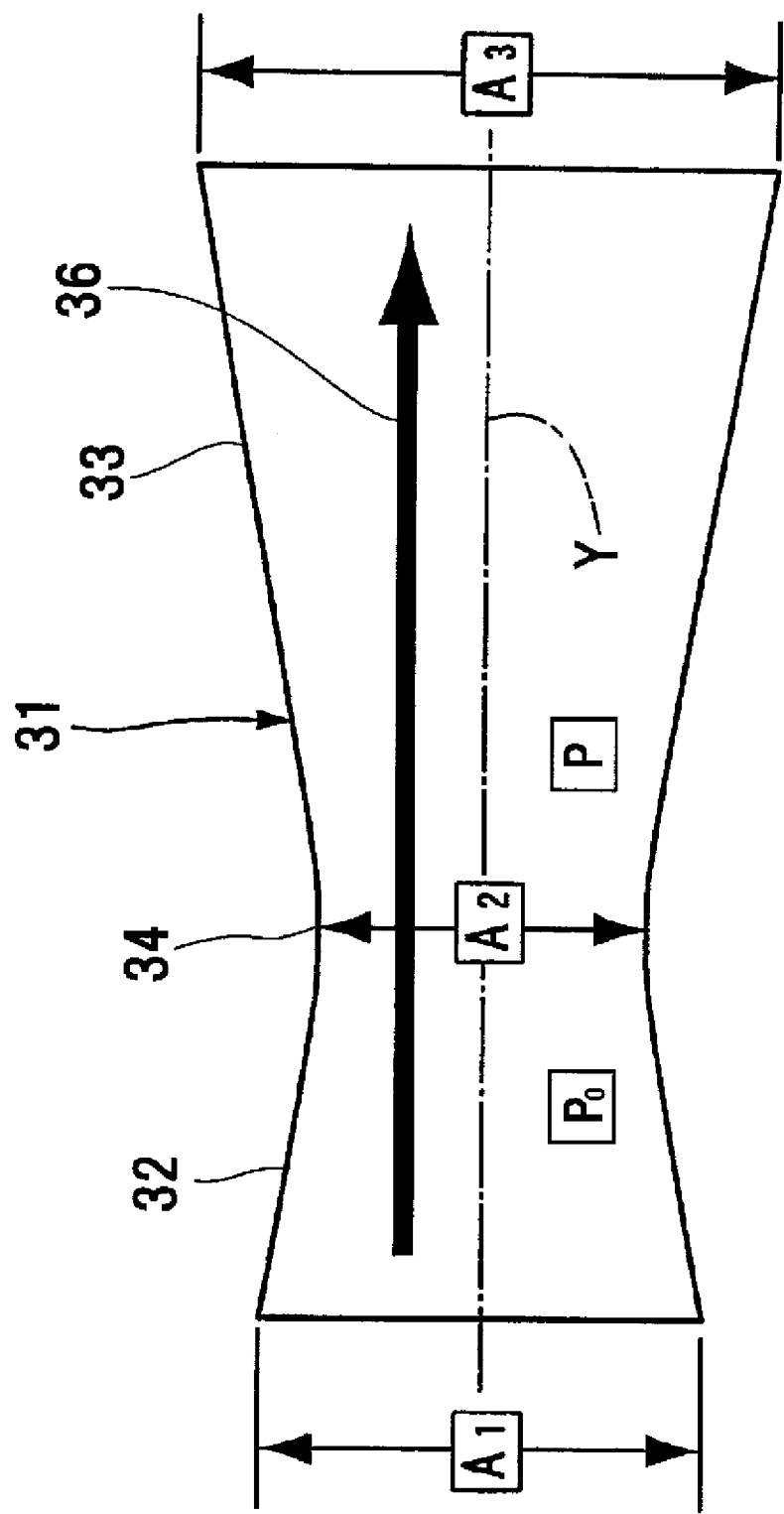
FIG. 2 shows a structure of a convergent-divergent nozzle.

Downstream with respect to the branch section 21, a convergent-divergent nozzle (generally called "de Laval nozzle") 31 is provided. As shown in FIG. 2, the convergent-divergent nozzle 31 includes a convergent section 32 including a flow path cross-sectional area which decreases as the fluid progresses, a divergent section 33 provided downstream with respect to the convergent section 32 and including a flow path cross-sectional area which increases as the fluid progresses, and a throat section 34 provided between the convergent section 32 and the divergent section 33 and including the smallest flow path cross-sectional area. In FIG. 2, the arrow indicates the direction in which the fluid progresses. The convergent-divergent nozzle 31 accelerates the velocity of the exhaust gas flowing in the exhaust path 16 from a subsonic velocity to an ultrasonic velocity. Referring to FIG. 2, flow path cross-sectional area A1 at an upstream end of the convergent section 32, flow path cross-sectional area A2 of the throat section 34, and flow path cross-sectional area A3 at a downstream end of the divergent section 33 have the relationships of A1>A2 and A2<A3. In this preferred embodiment, the flow path cross-sectional areas of the convergent section 32 and the divergent section 33 each change at a constant rate in the flow direction. There is no specific limitation on the shape of the convergent section 32 and the divergent section 33. The convergent section 32 and the divergent section 33 may have a shape including a flow path cross-sectional area changing step by step like a nozzle adopted for rockets, or may have a smoothly curved shape, for example.

In this preferred embodiment, the divergent section 33 is preferably connected to the only one combustion chamber 10 provided upstream with respect to the divergent section 33 via the exhaust path 16. Therefore, the exhaust gas 36 discharged from the exhaust port 9a provided in the only one combustion chamber 10 flows into the divergent section 33.

The convergent-divergent nozzle 31 has a structure that fulfills the conditions represented by expressions (1) and (2) below. As a result of the velocity of the exhaust gas flowing into the throat section 34 reaching Mach 1 (i.e., the sonic velocity), the exhaust gas in the divergent section 33 can be accelerated to an ultrasonic velocity.

Expression 1

$$\frac{dM}{dx} = \frac{\Lambda}{1 - M^2} \tag{1}$$

Expression 2

$$\Lambda \equiv M\left[1+\frac{\gamma-1}{2}M^2\right]\left[\frac{\gamma M^2}{2}\left(\frac{4f}{D}\right)-\frac{1}{A}\frac{dA}{dx}\right] \quad (2)$$

Among these expressions, expression (1) represents the relationship between the shape of the exhaust pipe and the Mach number in a primary flow accompanied by viscous friction. Expression (2) represents Λ in expression (1). In these expressions, M represents the Mach number, A represents the cross-sectional area of the exhaust pipe at an arbitrary cross-section, D represents the diameter of the pipe at the arbitrary cross-section, γ represents the specific heat ratio, x represents the distance in the flow direction, and f represents the frictional coefficient.

Figure 3:
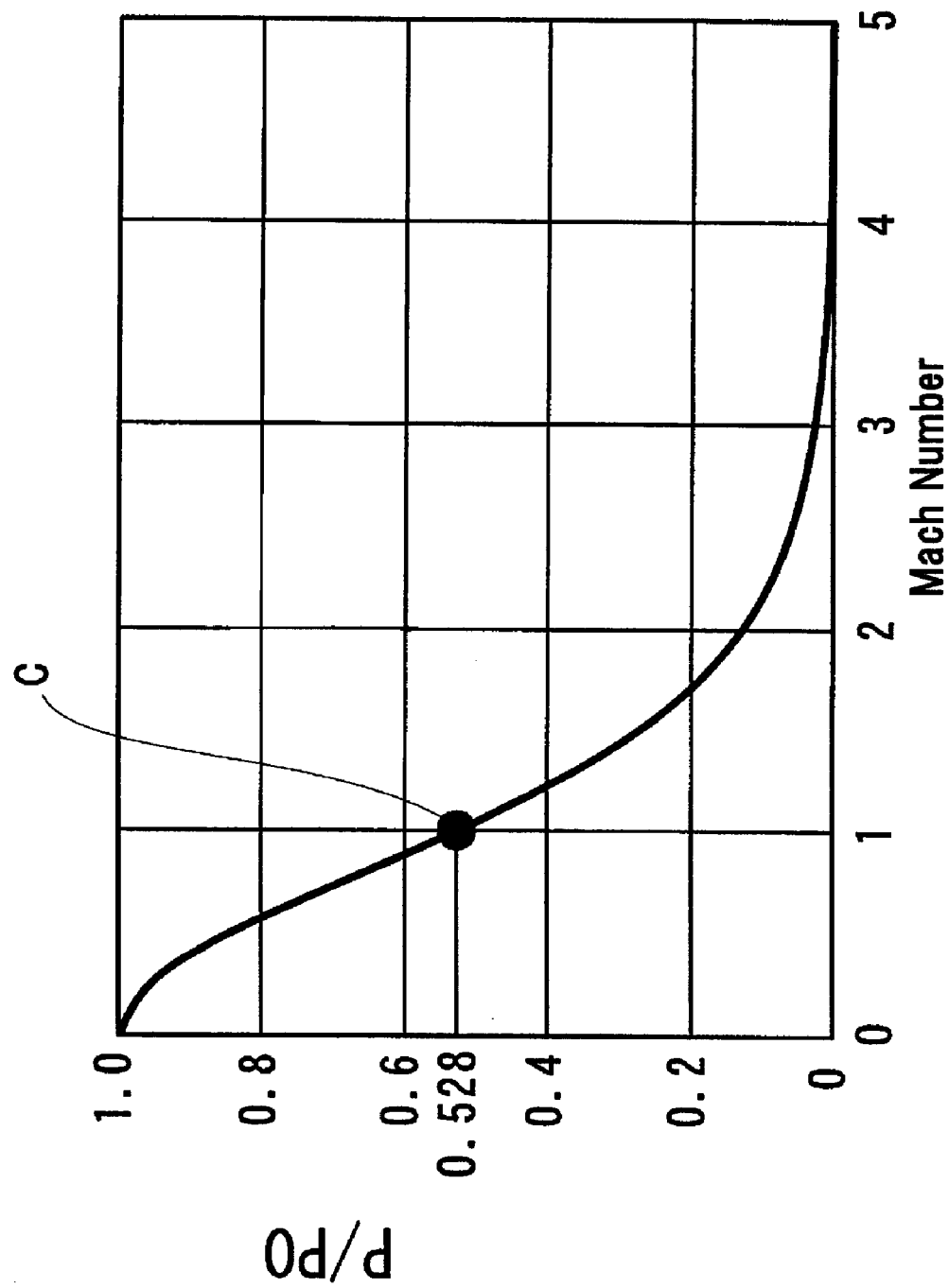
FIG. 3 shows the relationship between the pressure ratio and the Mach number in the convergent-divergent nozzle.

With the convergent-divergent nozzle 31 including the above-described structure, when the pressure ratio of the full pressure P0 of the fluid in the convergent section 32 and the static pressure P of the fluid in the divergent section 33, i.e., P/P0, is smaller than the critical pressure ratio (about 0.528; point C in FIG. 3), the velocity of the fluid is the sonic velocity in the throat section and is an ultrasonic velocity in the divergent section 33. FIG. 3 shows the pressure ratio of the full pressure P0 of the fluid in the convergent section 32 and the static pressure P of the fluid in the divergent section 33, i.e., P/P0, and the velocity of the fluid passing the divergent section 33 at each pressure ratio. When the full pressure P0 in the convergent section 32 is increased in order to make P/P0 smaller than the critical pressure ratio, the velocity can be an ultrasonic velocity in the convergent-divergent nozzle 31.

When the velocity becomes an ultrasonic velocity in the convergent-divergent nozzle 31, a shock wave propagating in a downstream direction in the divergent section 33 and an expansion wave propagating in an upstream direction in the divergent section 33 are generated. Therefore, the fluid in a space between the shock wave progressing in the downstream direction in the exhaust path 16 and the expansion wave progressing in the upstream direction in the exhaust path 16 expands rapidly, and so the pressure of the exhaust gas flowing in the exhaust path 16 can be decreased. As a result, the temperature of the exhaust gas can be rapidly decreased by an adiabatic cooling effect caused by adiabatic expansion. As a result of active studies, the present inventors have realized such a state by combining the convergent-divergent nozzle 31 and the branch section 21.

Figure 4:
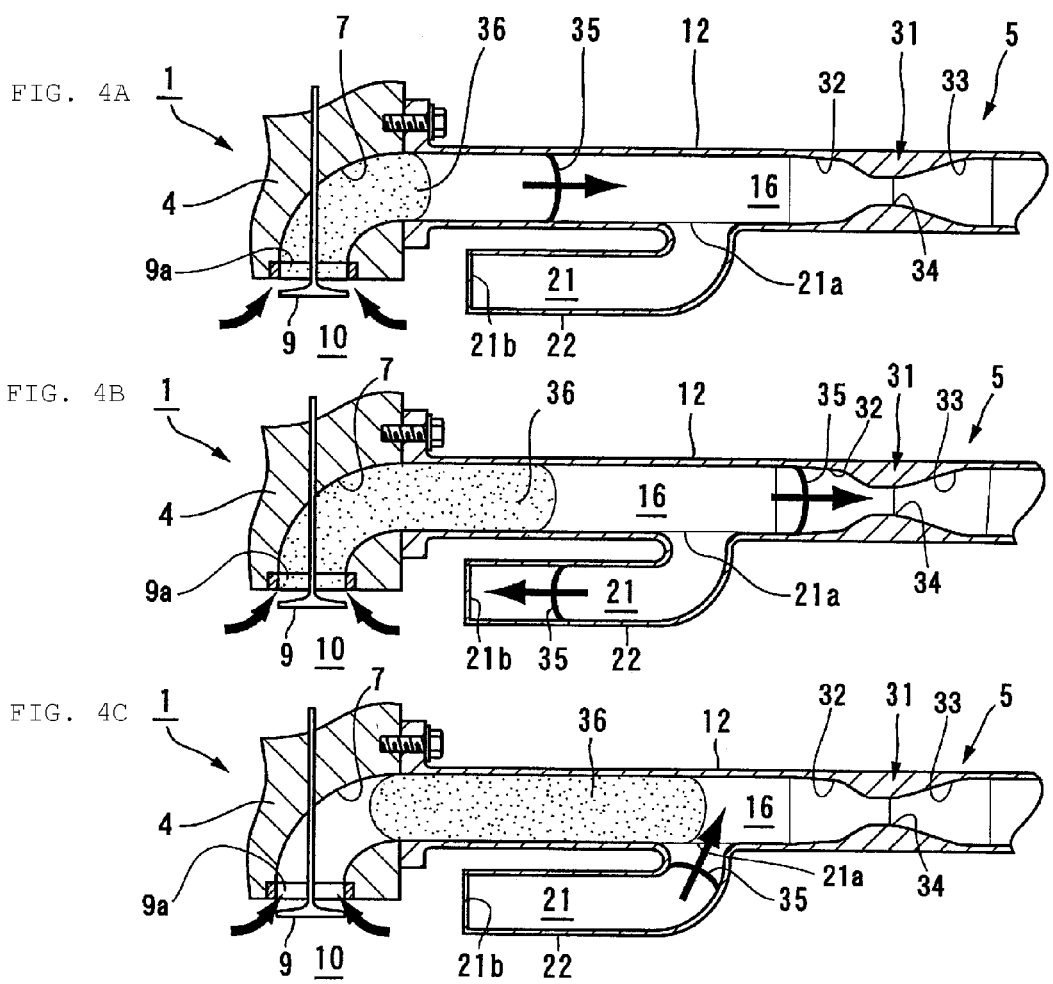

Now, with reference to FIGS. 4A through 4C, a method for putting the exhaust gas into a low-pressure and low-temperature state will be described. FIGS. 4A through 4C schematically show the exhaust device 5. In FIGS. 4A through 4C, identical or equivalent elements to those in FIG. 1 or FIG. 2 bear identical reference numerals assigned thereto.

As shown in FIG. 4A, when the exhaust port 9a is opened in an exhaust stroke of the internal combustion engine 1, the exhaust gas 36 of a high pressure is injected from the combustion chamber 10 into the upstream section 7 of the exhaust path 16 via the exhaust port 9a. At the time when the exhaust port 9a starts opening, the pressure difference between the combustion chamber 10 and the upstream section 7 of the exhaust path 16 is large. Therefore, the velocity of the exhaust gas 36 becomes the sonic velocity and as a result, a shock wave 35 is generated in the upstream section 7 of the exhaust path 16. As the opening angle of the exhaust port 9s increases, the amount of the exhaust gas 36 flowing into the exhaust path 16 increases but the velocity of the exhaust gas 36 decreases.

The velocity of the exhaust gas 36 also decreases as the exhaust gas 36 progresses in the exhaust path 16. As shown in FIG. 4A, the shock wave 35 propagates in the downstream direction in the exhaust path 16. Meanwhile, the exhaust gas 36 progresses in the downstream direction in the exhaust path 16 with a delay with respect to, and at a lower velocity than, the shock wave 35.

As shown in FIG. 4B, the shock wave 35 progressing in the exhaust path 16 is separated into a shock wave propagating in the exhaust path 16 and a shock wave propagating in the branch section 21 at an entrance 21a of the branch section 21, and then these shock waves progress separately in the exhaust path 16 and the branch section 21. The shock wave 35 propagating in the exhaust path 16 is attenuated and disappears after passing the convergent-divergent nozzle 31. By contrast, the branched shock wave 35 propagating in the branch section 21 is reflected by the reflecting section 21b of the branch section 21 and propagates oppositely in the branch section 21 to return to the exhaust path 16.

The time from when the exhaust port 9a is opened and the exhaust gas 36 is generated until the exhaust gas 36 reaches the entrance 21a of the branch section 21 is set as $T_1$. The time from when the shock wave 35 is generated at the exhaust port 9a until the shock wave 35 is reflected by the reflecting section 9b of the branch section 21b and reaches the entrance 21a of the branch section 21 is set as $T_2$. When $T_1 \leq T_2$ is fulfilled, as shown in FIG. 4C, the shock wave 35 and the exhaust gas 36 collide against each other at a position downstream with respect to the entrance 21a of the branch section 21. The branch section 21 has such a length that the shock wave 35 reflected by the branch section 21 and the exhaust gas 36 collide against each other at the entrance 21a of the branch section 21.

Figure 5:
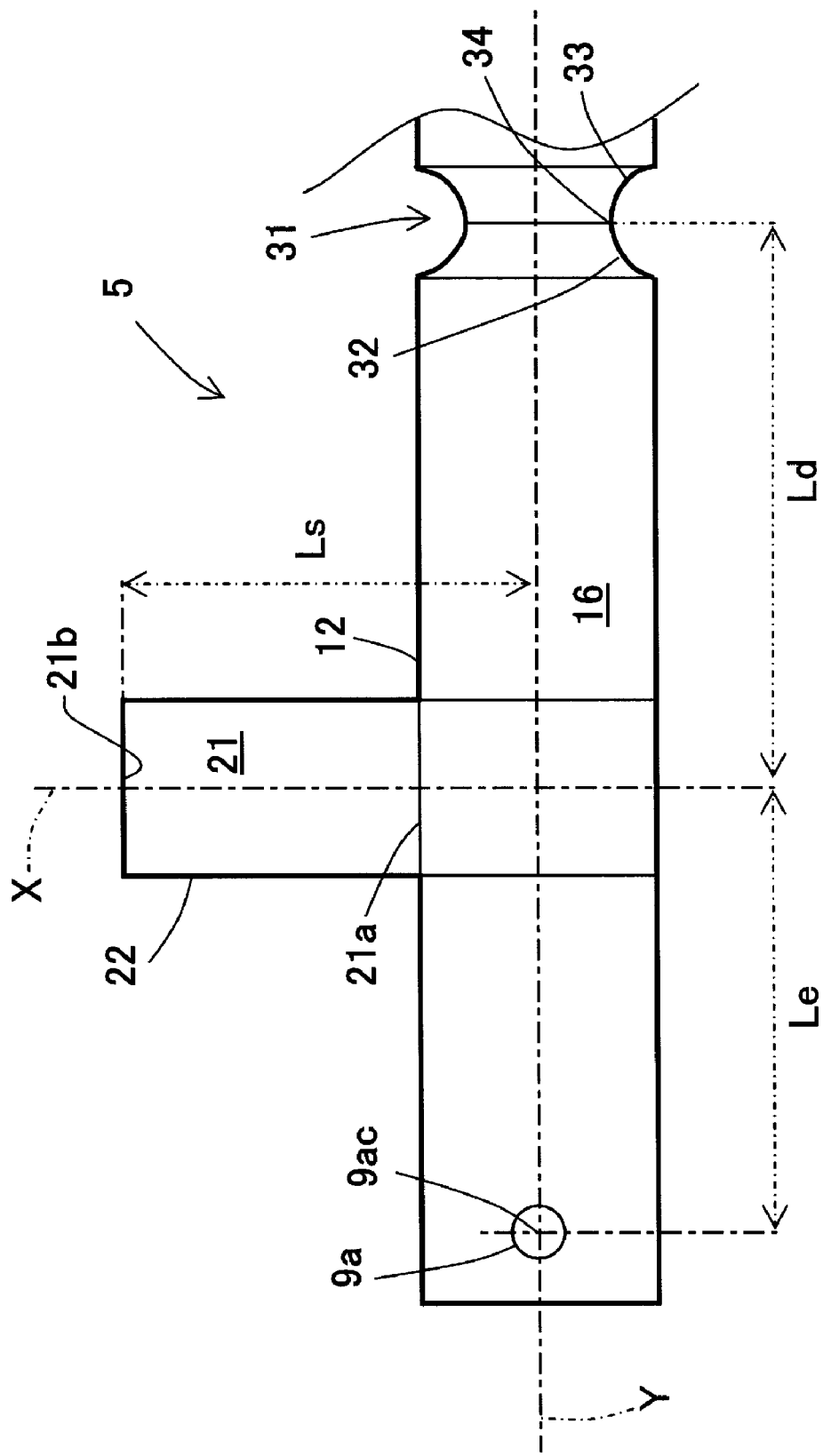
FIG. 5 is a schematic view of the exhaust path and the like, showing a route in the exhaust path in which the shock wave progresses and a route in the exhaust path in which the exhaust gas progresses.

As shown in FIG. 5, the distance from center 9ac of the exhaust port 9a to center line X of the flow path cross-section at the entrance 21a of the branch section 21 is set as Le, and the distance from center line Y of the flow path cross-section of the exhaust path 16 to the reflecting section 21b is set as Ls. The velocity of the exhaust gas 36 is set as Ve, and the propagation velocity of the shock wave 35 is set as Vs. In this case, time $T_1$, which is from when the exhaust port 9a is opened until the exhaust gas 36 reaches the entrance 21a of the branch section 21, is represented by expression (3). Time $T_2$, which is from when the exhaust port 9a is opened until the shock wave is reflected by the reflecting section 21b of the branch section 21 and reaches the center line Y of the exhaust path 16, is represented by expression (4).

$$T_1 = Le/Ve \quad (3)$$

$$T_2 = (Le+2Ls)/Vs \quad (4)$$

When $T_1$ is equal to or smaller than $T_2$ ($T_1 \leq T_2$) the reflected shock wave 35 and the exhaust gas 36 collide against each other at a position downstream with respect to the entrance 21a of the branch section 21. Specifically, when Le/Ve≦(Le+2Ls)/Vs, the shock wave 35 and the exhaust gas 36 collide against each other at a position downstream with respect to the entrance 21a of the branch section 21. For the sake of convenience, for example, the maximum velocity of the exhaust gas 36 may be regarded as the velocity Ve, or the average velocity of the exhaust gas 36 may be regarded as the velocity Ve. Similarly, for example, the maximum propagation velocity of the shock wave 35 may be regarded as the propagation velocity Vs, or the average propagation velocity of the shock wave 35 may be regarded as the propagation velocity Vs.

As shown in FIG. 5, the distance from the center line X of the flow path cross-section at the entrance 21a of the branch section to an upstream end of the divergent section 33 of the convergent-divergent nozzle 31 is set as Ld, and the time from when the exhaust valve 9 is opened until the exhaust valve 9 is closed is set as tv. Time $T_3$, which is from when the exhaust port 9a is opened until a trailing end of the exhaust gas 36 reaches the upstream end of the divergent section 33, is represented by expression (5). Time $T_4$, which is from when the exhaust port 9a is opened until the shock wave is reflected by the reflecting section 21b and reaches the upstream end of the divergent section 33, is represented by expression (6).

$$T_3 = tv + (Le + Ld)/Ve \quad (5)$$

$$T_4 = (Le + 2Ls + Ld)/Vs \quad (6)$$

When $T_4$ is equal to or smaller than $T_3$ ($T_4 \leq T_3$) the shock wave 35 and the exhaust gas 36 can be caused to collide against each other before the entirety of the exhaust gas 36 passes the throat section 34. Specifically, when $(Le+2Ls+Ld)/Vs \leq tv+(Le+Ld)/Ve$, the shock wave 35 and the exhaust gas 36 can be caused to collide against each other before the entirety of the exhaust gas 36 passes the throat section 34.

In the case where the distance Ls between the entrance 21a of the branch section 21 and the reflecting section 21b is relatively short, the attenuation of the shock wave 35 in the branch section 21 is suppressed. For example, the distance Ls may be shorter than the distance Le.

By causing the shock wave 35 and the exhaust gas 36 to collide against each other at a position downstream with respect to the entrance 21a and upstream with respect to the divergent section 33, the pressure of the exhaust 36 flowing in the exhaust path can be increased. When this occurs, the full pressure P0 upstream with respect to an entrance of the convergent-divergent nozzle 31 is increased. Thus, the ratio of the full pressure P0 upstream with respect to the entrance and the static pressure P downstream with respect to the throat section 34, i.e., P/P0, becomes lower than the critical pressure ratio of about 0.528, for example. As a result, the velocity of the exhaust gas 36 reaches the sonic velocity in the throat section 34.

Figure 6:
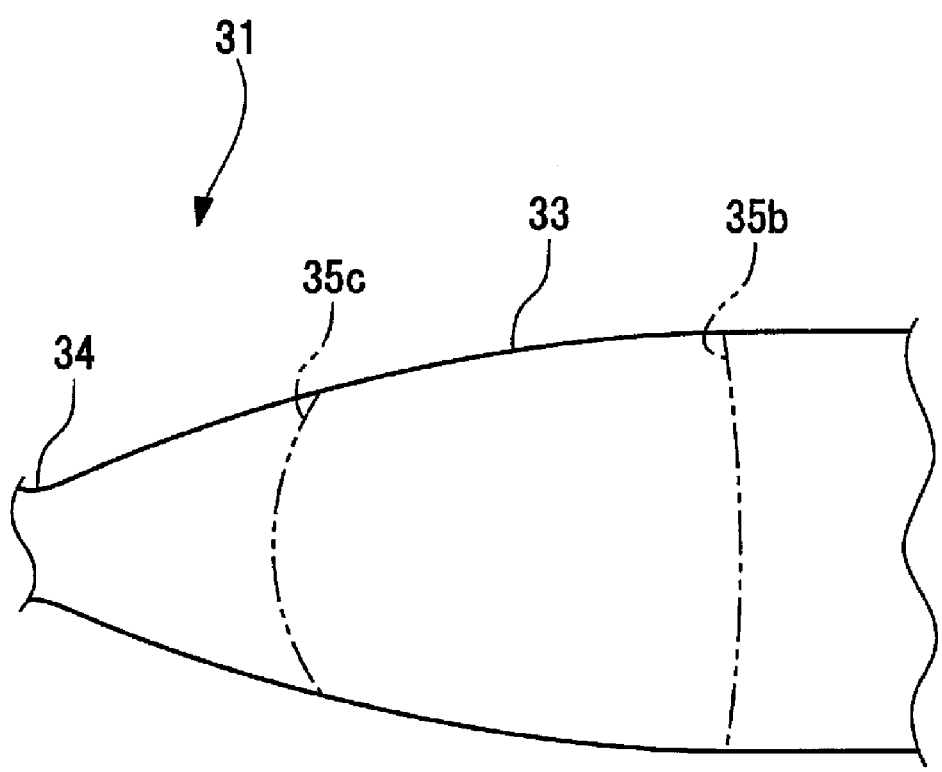
FIG. 6 is a schematic view drawn based on a photograph of an inside of the convergent-divergent nozzle taken by the Schlieren method.

FIG. 6 is a schematic view drawn based on a photograph of an inside of the convergent-divergent nozzle taken by the Schlieren method. As a result of the velocity of the exhaust gas 36 reaching the sonic velocity, a new shock wave is generated in the convergent-divergent nozzle 31. The new shock wave 35b is accelerated when passing the divergent section 33 of the convergent-divergent nozzle 31. As shown in FIG. 6, when the shock wave 35b is generated, an expansion wave 35c progressing oppositely to the shock wave 35b is generated. As a result of the shock wave 35b being accelerated in the divergent section 33 and by the expansion wave 35c progressing oppositely to the shock wave 35b, the pressure of the exhaust gas 36 present between the shock wave 35b and the expansion wave 35c is significantly decreased to be equal to or lower than the atmospheric pressure by an adiabatic cooling effect caused by adiabatic expansion.

Figure 7:
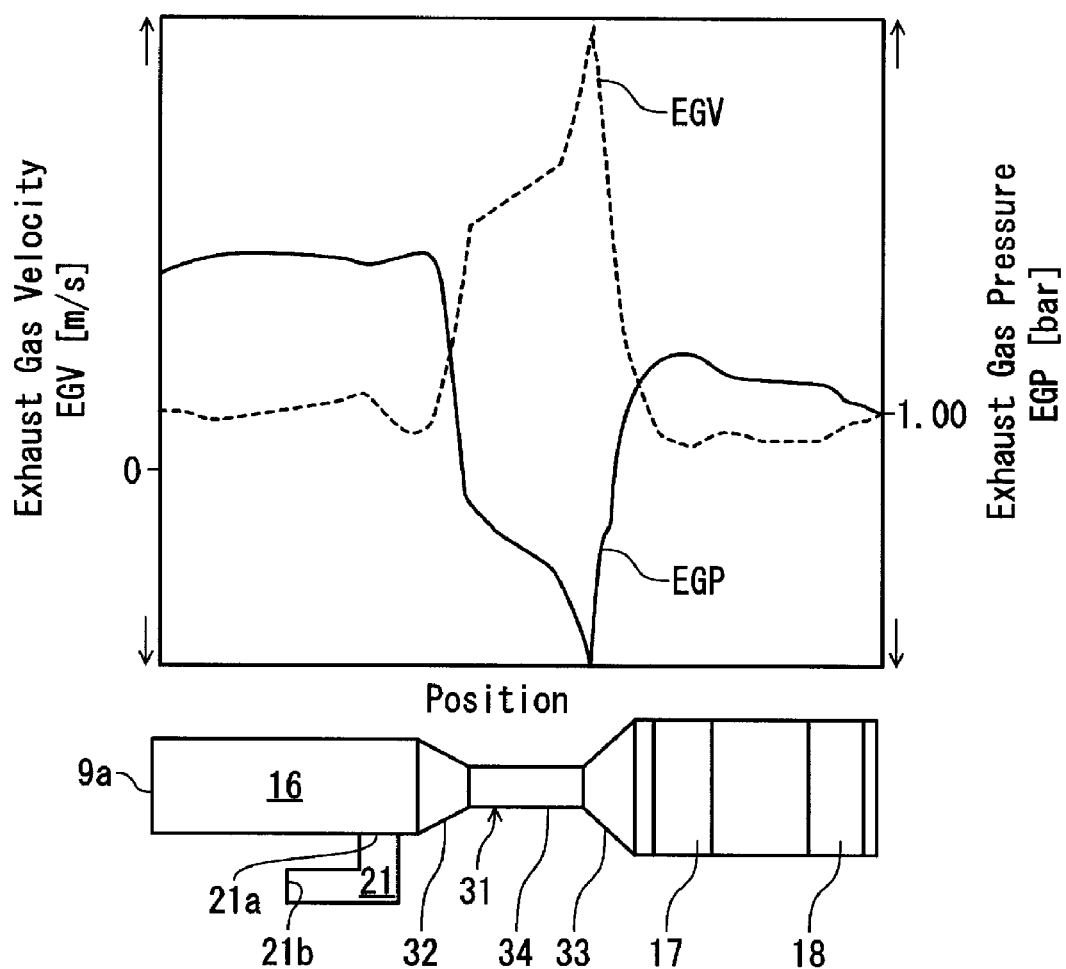
FIG. 7 is a graph showing the relationship between the exhaust gas velocity and the exhaust gas pressure when the shock wave is accelerated.
Figure 8:
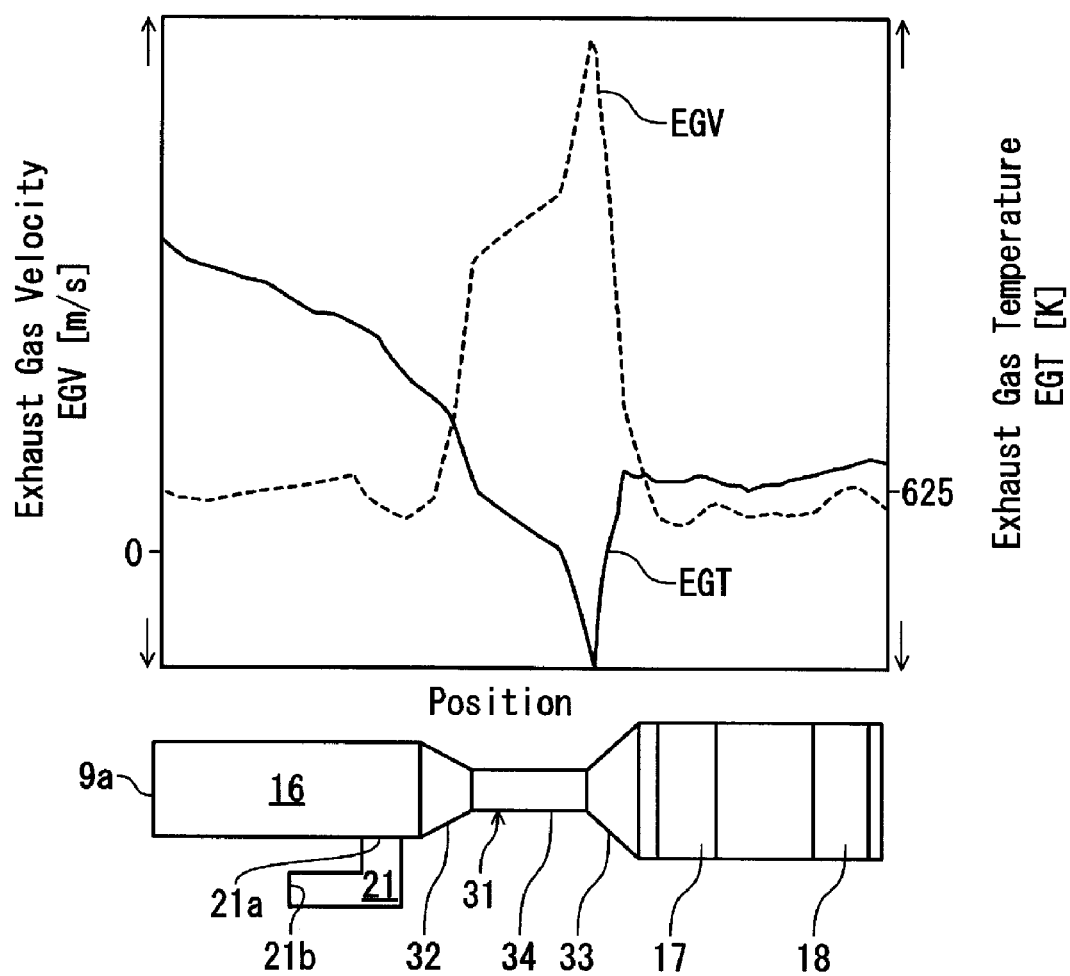
FIG. 8 is a graph showing the relationship between the exhaust gas velocity and the exhaust gas temperature when the shock wave is accelerated.

FIG. 7 and FIG. 8 show the results of simulations performed by the present inventors. FIG. 7 shows the exhaust gas velocity and the exhaust gas pressure at points in the exhaust path 16 immediately after the new shock wave 35b is generated in the convergent-divergent nozzle 31. FIG. 8 shows the exhaust gas velocity and the exhaust gas temperature at the points in the exhaust path 16 immediately after the new shock wave 35b is generated in the convergent-divergent nozzle 31. After the shock wave 35b is generated in the convergent-divergent nozzle 31, the shock wave 35b is accelerated in the divergent section 33. When this occurs, as shown in FIG. 7 and FIG. 8, the velocity of the exhaust gas is rapidly increased, whereas the pressure and the temperature of the exhaust gas are rapidly decreased. FIG. 1 and FIG. 8 show the velocity of the exhaust gas and do not show the propagation velocity of the shock wave. In FIG. 7 and FIG. 8, the throat section 34 of the convergent-divergent nozzle 31 is set to be relatively long. After the shock wave 35 reflected by the branch section 21 collides against the exhaust gas 36, the shock wave 35 propagates in the throat section 34 preceding the exhaust gas 36. At this point, adiabatic expansion is generated in the space between the exhaust gas 36 and the shock wave 35a and thus the pressure is decreased. Therefore, the exhaust gas 36 is sucked by the shock wave 35 to flow in the throat section 34, without decreasing in velocity thereof. Therefore, by setting the length of the throat section 34 having a constant flow path cross-sectional area in accordance with the internal combustion engine, the timing at which the shock wave 35b is to be accelerated in the divergent section 33, in other words, the timing at which the pressure and temperature of the exhaust gas are to be decreased, can be set in accordance with the internal combustion engine.

As described above, the internal combustion engine 1 according to this preferred embodiment can significantly decrease the temperature and pressure of the exhaust gas in the exhaust path 16 as compared to the conventional art. The internal combustion engine 1 according to this preferred embodiment preferably includes only one combustion chamber 10 upstream with respect to the divergent section 33, and so is not influenced by exhaust gas from the other cylinders unlike in the conventional art. By decreasing the temperature and pressure of the exhaust gas in this manner, the performance of the internal combustion engine 1 can be improved, for example, as described below.

In this preferred embodiment, the temperature of the exhaust gas 36 in the exhaust path 16 can be decreased upstream with respect to the first catalyst 17. Therefore, the temperature of the first catalyst 17 and the second catalyst 18 is prevented from increasing excessively. In the case where the first catalyst 17 and the second catalyst 18 are a three way catalyst, when the temperature is excessively high, the phenomenon called "sintering" occurs to lower the cleaning efficiency. However, in this preferred embodiment, such sintering can be effectively prevented. Since sintering is prevented in this preferred embodiment even when the internal combustion engine is driven in a high load state, the fuel can be combusted at the theoretical air/fuel ratio. Therefore, the exhaust gas 36 can be efficiently cleaned by the first catalyst 17 and the second catalyst 18. In other words, in this preferred embodiment, the cleaning performance, which is one performance of the internal combustion engine 1, can be improved. In this preferred embodiment, two catalysts are preferably arranged in series in the middle of the exhaust path 16, but the present invention is not limited to this. There may be only one catalyst, or three or more catalysts, for example. A plurality of catalysts may be located in parallel, for example.

As a result of the significant decrease of the pressure of the exhaust gas as in this preferred embodiment, the pumping loss of the internal combustion engine 1 can be reduced. The pressure of the exhaust gas in the exhaust path 16 is significantly decreased. As a result, the piston (not shown) of the internal combustion engine 1 is pulled toward the exhaust path 16, namely, toward the top dead center, in the exhaust stroke, and so the work necessary for driving the piston in the exhaust stroke is reduced.

Figure 9A:
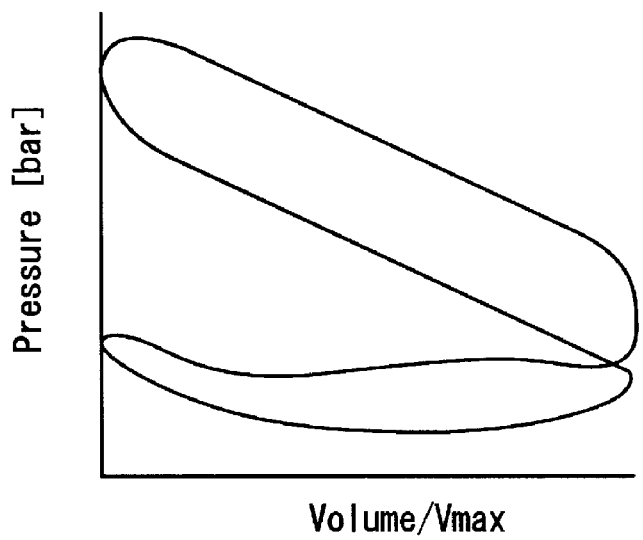
Figure 9B:
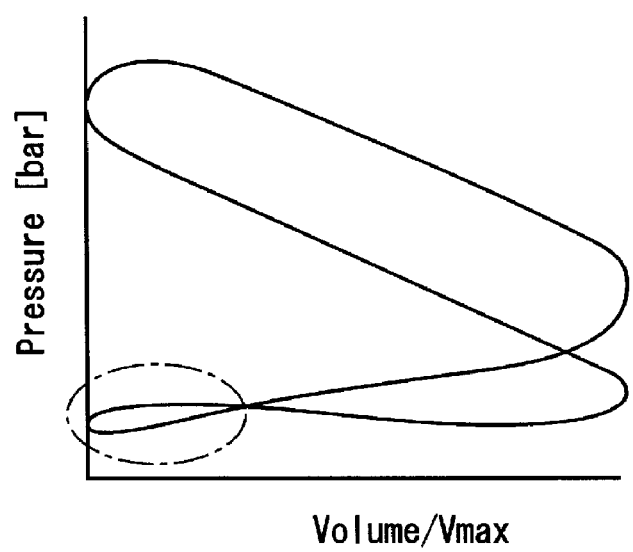

This will be described in more detail with reference to FIGS. 9A and 9B. FIG. 9A shows a P-V diagram of a conventional internal combustion engine, and FIG. 9B shows a P-V diagram of the internal combustion engine 1 in this preferred embodiment. In this preferred embodiment, as shown in FIG. 9B, a region surrounded by the closed curve appears in the vicinity of the top dead center of the exhaust stroke of the internal combustion engine (in the region surrounded by the one-dot chain line). The region surrounded by the closed curve corresponds to the work conducted by the internal combustion engine 1. Namely, when the pressure of the exhaust gas is significantly decreased by the generation of the shock wave 35b in the divergent section 33, the piston is pulled by the exhaust gas, which enabled the internal combustion engine 1 to perform positive work in the exhaust stroke.

Preferred Embodiment 2

Figure 10:
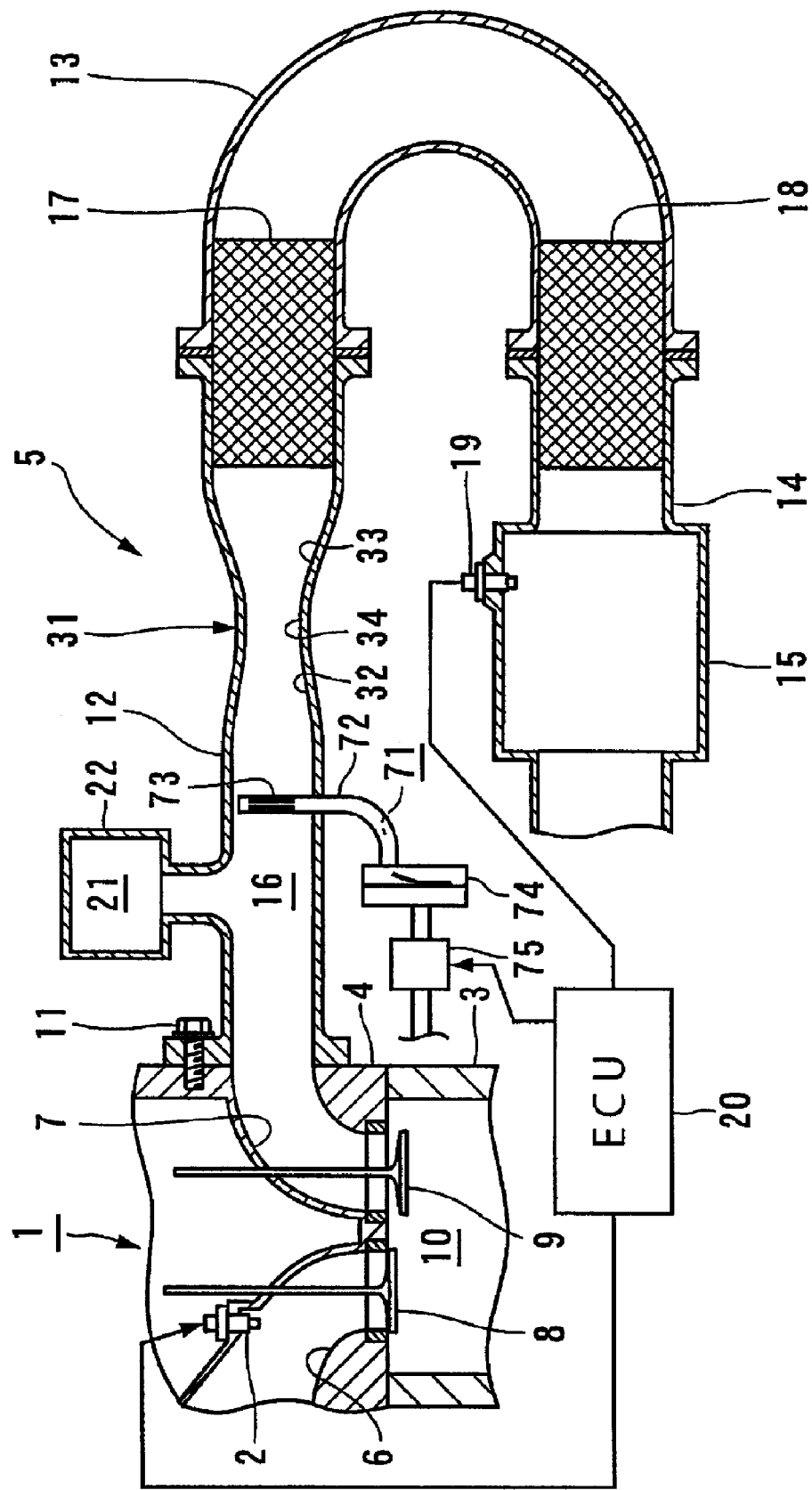
FIG. 10 shows a structure of an internal combustion engine according to Preferred Embodiment 2, and is a cross-sectional view of an exhaust path and the like thereof.

According to a preferred embodiment of the present invention, since the pressure of the exhaust gas in the exhaust path 16 is decreased, secondary air is easily supplied to the exhaust path 16. Thus, as shown in FIG. 10, an air path 71 arranged to supply secondary air can be provided in the exhaust path 16. Except for this structural difference, Preferred Embodiment 2 preferably is exactly the same as Preferred Embodiment 1. Accordingly, the detailed description of Preferred Embodiment 2 is provided by the detailed description of FIG. 1 through FIG. 9B relating to Preferred Embodiment 1.

An air supply pipe 72 is connected between the branch pipe 22 and the convergent-divergent nozzle 31 in the first exhaust pipe 12. A leading end of the air supply pipe 72 extends to the inside of the exhaust path 16. An air outlet 73 preferably has a slit-shaped configuration at the leading end of the air supply pipe 72. Owing to this structure, the air supply pipe 72 can supply air to a wide region of the exhaust path 16.

An upstream end of the air supply pipe 72 is connected outside the internal combustion engine via a lead valve 74 and an air amount control value 75. The lead valve 74 prevents the exhaust gas from flowing outside the internal combustion engine from the air supply pipe 72. The lead valve 74 is arranged to be opened by a negative pressure generated in the exhaust path 16 to cause the air to flow toward the air outlet 73 of the air supply pipe 72. The air amount control valve 75 is arranged to control and adjust the amount of the air to the driving state of the internal combustion engine 1. The air amount control valve 75 preferably includes an actuator, a servo motor, a solenoid or the like, for example. The opening angle of the air amount control valve 75 is controlled by the ECU 20. The air supply pipe 72 may be connected to the intake path of the internal combustion engine 1.

When the opening angle of the throttle valve is smaller than a prescribed angle, the ECU 20 causes the air amount control valve 75 to close or to relatively decrease the opening angle of the throttle valve. The prescribed angle is preset and stored in the ECU 20. When the opening angle of the throttle valve is larger than the prescribed angle, the ECU 20 increases the opening angle of the air amount control valve 75. As a result, the opening angle of the air amount control valve 75 is increased or decreased in accordance with the opening angle of the throttle valve. The provision of the air amount control valve 75 allows the air to be supplied to the exhaust path 16 at an appropriate flow rate with no excessiveness or shortage. The air amount control valve 75 is not absolutely necessary and may be omitted.

In this preferred embodiment, the air can be efficiently supplied into the exhaust path 16 by a negative pressure generated in the exhaust path 16. The negative pressure is significantly higher than, namely, the pressure is significantly lower than, that in a general internal combustion engine which does not include the convergent-divergent nozzle 31 or the branch pipe 22. The phenomenon that a negative pressure is generated by the action of the convergent-divergent nozzle 31 continues even when the rotational speed of the internal combustion engine 1 increases to be higher than the rotational speed at the time of the maximum output. Therefore, in this preferred embodiment, even when the rotational speed of the internal combustion engine 1 becomes high, a sufficient amount of air can be supplied to the exhaust path 16. In a conventional internal combustion engine, no negative pressure is generated in the exhaust path in a high rotational speed or high load state, and therefore a large pump is used to forcibly supply the air. By contrast, in this preferred embodiment, a sufficient amount of air can be supplied to the exhaust path 16 without using a separate device for forcibly supplying the air into the exhaust path 16, such as an air pump or the like.

The temperature of the air to be supplied to the exhaust path 16 is roughly equal to the temperature of the outside air, and is significantly lower than that of the exhaust gas. Therefore, in this preferred embodiment, the temperature of the exhaust gas can be further decreased by the air having a low temperature, which is supplied into the exhaust path 16 in a large amount. Also in this preferred embodiment, a large amount of air can be supplied upstream with respect to the first catalyst 17. Therefore, even where the amount of fuel to be injected is increased in order to make the air/fuel ratio of the internal combustion engine 1 smaller than the theoretical air/fuel ratio, exhaust gas containing an equivalent amount of oxygen to where the air/fuel ratio is the theoretical air/fuel ratio can be supplied to the first catalyst 17. Therefore, in this preferred embodiment, the temperature of the exhaust gas can also be decreased by making the air/fuel ratio of the internal combustion engine 1 smaller than the theoretical air/fuel ratio and thus decreasing the combustion temperature. In addition, since the air/fuel ratio is smaller than the theoretical air/fuel ratio, it is possible to cool the elements in the vicinity of the combustion chamber 10 (intake valve 8, exhaust valve 9, valve seat, piston, etc.) with the extra fuel. Thus, the reliability of the internal combustion engine 1 can be improved.

Preferred Embodiment 3

Figure 11:
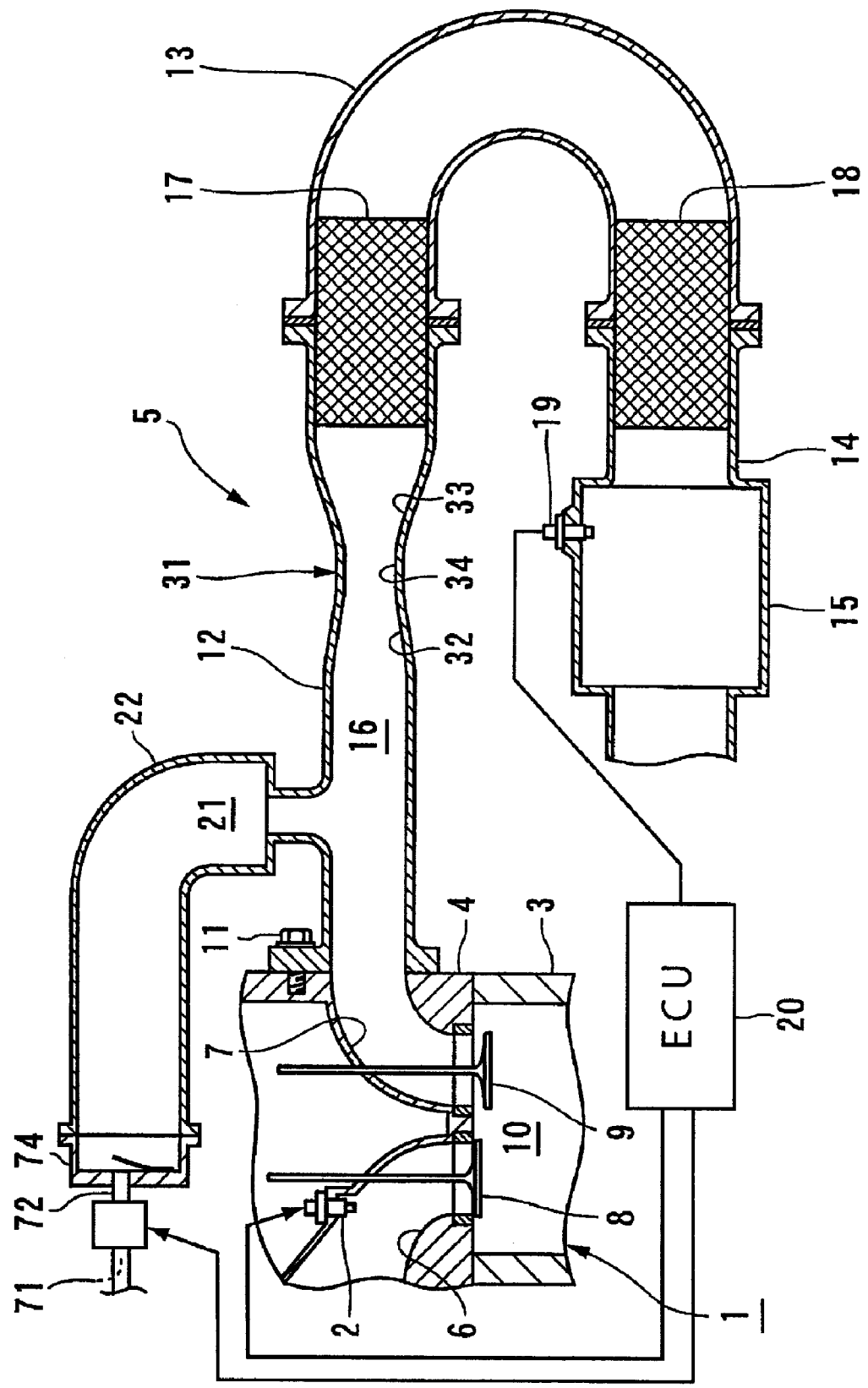
FIG. 11 shows a structure of an internal combustion engine according to Preferred Embodiment 3, and is a cross-sectional view of an exhaust path and the like thereof.

In Preferred Embodiment 3, the branch pipe 22 is used as a part of a secondary air supply pipe. As shown in FIG. 11, the lead valve 74 connected to the air supply pipe 72 is attached to the branch pipe 22. Except for this structural difference, Preferred Embodiment 3 preferably is exactly the same as Preferred Embodiment 1. Accordingly, the detailed description of Preferred Embodiment 3 is provided by the detailed description of FIG. 1 through FIG. 9B relating to Preferred Embodiment 1. The lead valve 74 acts as the reflecting section 21b of the branch pipe 22. In this preferred embodiment, an air supply path 71 is communicated to the exhaust path 16 via the branch section 21. The air supply pipe 72 may be inserted between a connection portion of the exhaust path 16 and the branch pipe 22 and a tip portion of the branch pipe 22.

In the exhaust device 5 in this preferred embodiment, when the exhaust valve 9 is opened, the lead valve 74 is closed. Thus, the shock wave can be reflected by the lead valve 74. When a negative pressure is generated in the exhaust path 16 by the action of the convergent-divergent nozzle 31, the lead valve 74 is opened and air can be supplied into the exhaust path 16 via the branch section 21. In this preferred embodiment also, a sufficient amount of air can be supplied into the exhaust path 16.

In this preferred embodiment, it is not necessary to form a path acting exclusively as the branch section 21. Therefore, the exhaust device 5 in this preferred embodiment costs less than the exhaust device 5 using the exclusive branch section 21 (e.g., the exhaust device 5 in Preferred Embodiment 2).

Preferred Embodiment 4

Figure 12:
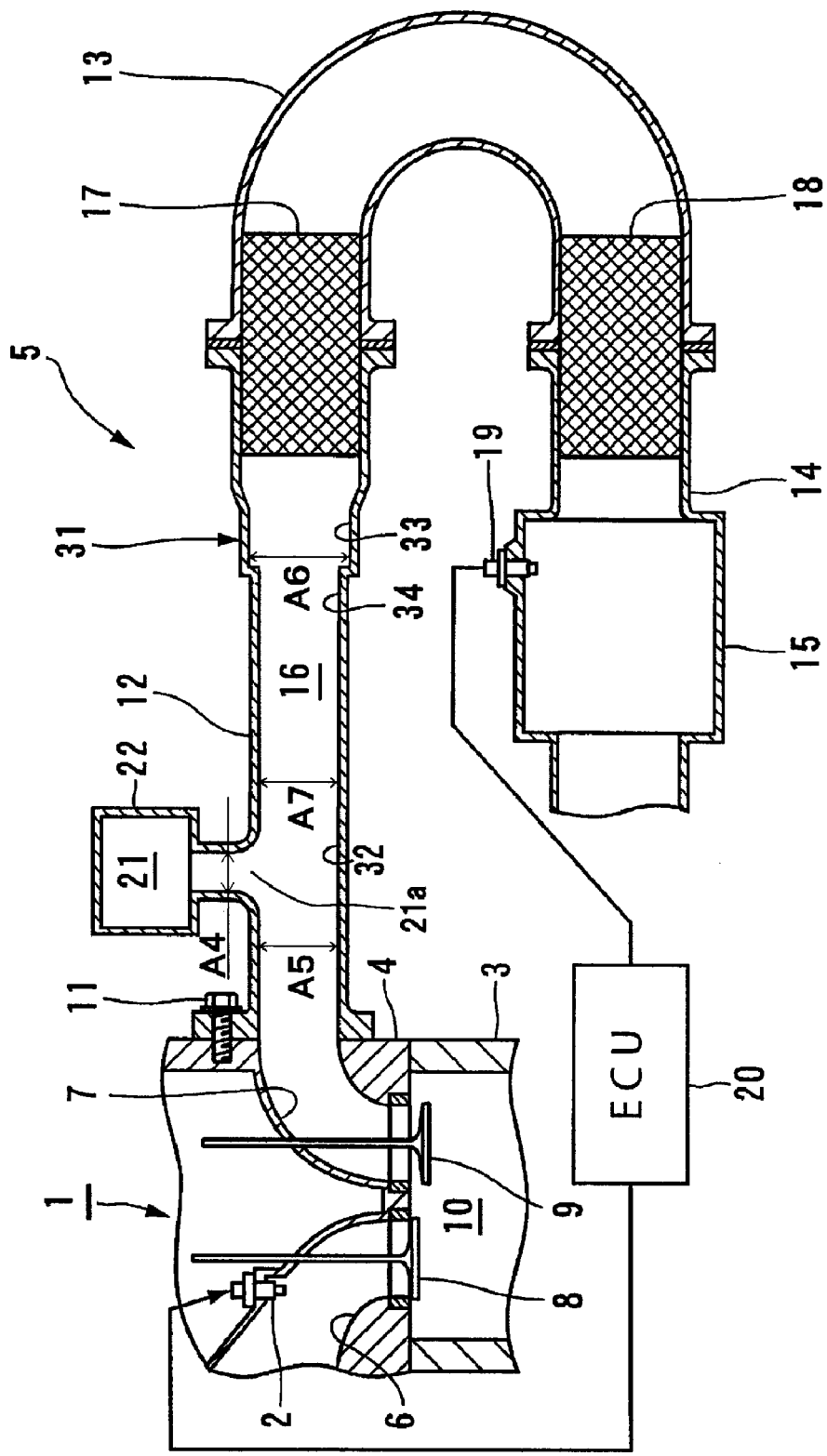
FIG. 12 shows a structure of an internal combustion engine according to Preferred Embodiment 4, and is a cross-sectional view of an exhaust path and the like thereof.

As shown in FIG. 12, in Preferred Embodiment 4, the branch pipe 22 is used as a portion of the convergent-divergent nozzle. Except for this structural difference, Preferred Embodiment 4 preferably is exactly the same as Preferred Embodiment 1. Accordingly, the detailed description of Preferred Embodiment 4 is provided by the detailed description of FIG. 1 through FIG. 9B relating to Preferred Embodiment 1. In Preferred Embodiments 1 and 2, the convergent section 32, the throat section 34 and the divergent section 33 are preferably located in a portion of the exhaust path 16 which is downstream with respect to the branch section 21. However, as a result of continuing the active studies, the present inventors conceived of a structure providing the same effect with a simpler structure. In this preferred embodiment, in order to generate the progressing shock wave 35b, which is a new shock wave, a branch section 21 arranged to reflect and propagate the shock wave 35 back to the exhaust path 16 is provided. Considering this branch section 21 from a different point of view, the exhaust path 16 has the flow path cross-sectional area thereof increased at the position of the branch section 21 and decreased downstream with respect to that position. In other words, the convergent section 32 and the throat section 34 are formed in the exhaust path by the branch section 21. In the case where flow path cross-sectional area A5 of a portion of the exhaust path 16 which is upstream with respect to the entrance 21a of the branch section 21 is roughly the same as flow path cross-sectional area A7 of a portion of the exhaust path 16 which is downstream with respect to the entrance 21a of the branch section 21, there is the following relationship. As shown in FIG. 12, a sum of flow path cross-sectional area A5 of the portion of the exhaust path 16 which is upstream with respect to the entrance 21a of the branch section 21 and flow path cross-sectional area A4 of the branch section 21 is larger than flow path cross-sectional area A7 of the portion of the exhaust path 16 which is downstream with respect to the entrance 21a. Specifically, A4+A5>A7. Accordingly, it can be regarded that the convergent section 32 and the throat section 34 are downstream with respect to the entrance 21a. Therefore, merely by providing the divergent section 33 downstream with respect to the entrance 21a, the convergent-divergent nozzle 31 can be substantially provided. A6 represents the flow path cross-sectional area of the divergent section 33, and A7<A6. A portion between the entrance 21a and the divergent section 33 is the throat section 34. The throat section 34 may be lengthy along the flow direction as shown here. The flow path cross-sectional area of the convergent section 32 and the divergent section 33 is not limited to be smoothly changing in the downstream direction, and may change step by step.

In Preferred Embodiments 1 through 4, the internal combustion engine 1 preferably puts the exhaust gas into a low pressure and low temperature state by the following method. The fuel is combusted in the combustion chamber 10. The exhaust valve 9 for opening or closing the exhaust port 9a of the combustion chamber 10 is opened to discharge the exhaust gas 36 to the exhaust path 16 from the combustion chamber 10. The shock wave 35 propagating in the exhaust path 16 at a higher velocity than the exhaust gas 36 is generated. At least a portion of the shock wave 35 is branched from the exhaust path 16, and the branched shock wave 35 is propagated back to the exhaust path 16 to cause the shock wave 35 to collide against the exhaust gas, thereby increasing the pressure of the exhaust gas. The flow path cross-sectional area of the exhaust path 16 is decreased to increase the pressure of the exhaust gas 36. Namely, the pressure of the exhaust gas is increased by causing the exhaust gas to flow in a portion of the exhaust path 16 in which the flow path cross-sectional area is decreased in the downstream direction. In addition, the velocity of the exhaust gas 36 is increased by increasing the flow path cross-sectional area of the exhaust path 16. Namely, the velocity of the exhaust gas is increased by causing the exhaust gas to flow in a portion of the exhaust path 16 in which the flow path cross-sectional area is increased in the downstream direction. The new shock wave 35b propagating in the downstream direction in the exhaust path 16 is generated to form a region of a negative pressure in the exhaust path 16. The exhaust gas is put into a low pressure and low temperature state by an adiabatic cooling effect caused by adiabatic expansion. Therefore, the exhaust gas can be put into the low pressure and low temperature state even where the internal combustion engine 1 is driven in a high load state or at a high velocity.

Figure 14A:
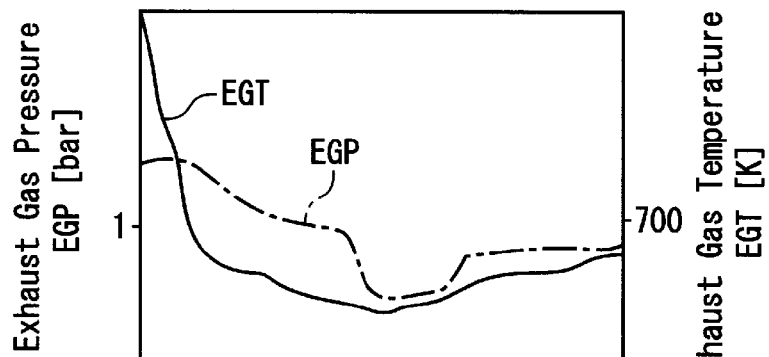
FIGS. 14A-14D show the relationship between the exhaust gas pressure and the exhaust gas temperature in time sequence.
Figure 14B:
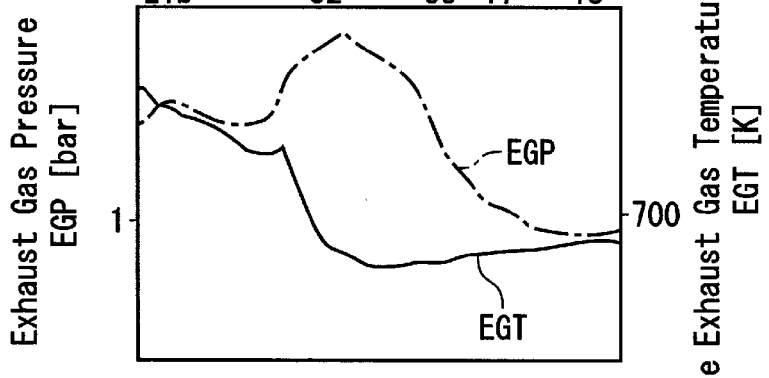
Figure 14C:
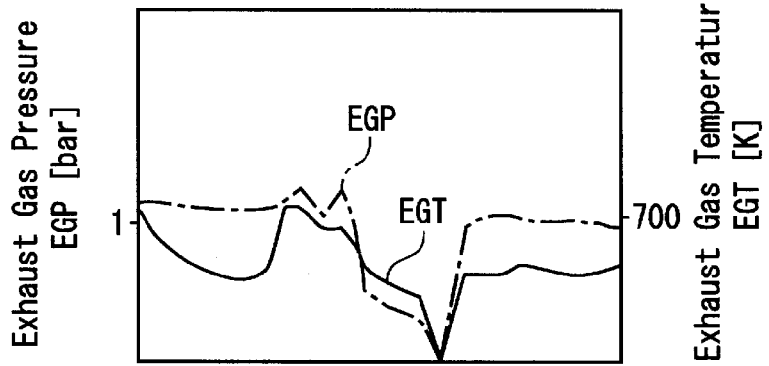
Figure 14D:
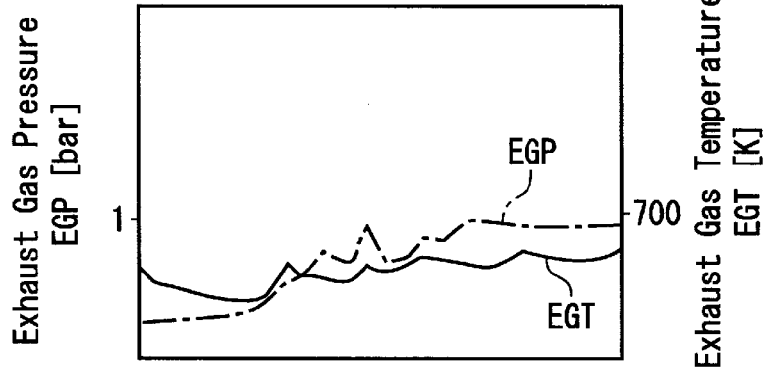

With reference to FIGS. 13A-13D and FIGS. 14A-14D, the above-described exhausting method for the internal combustion engine will be described in more detail. FIGS. 13A-13D show the relationship between the exhaust gas velocity and the exhaust gas pressure in the exhaust path 16 in time sequence. FIGS. 14A-14D show the relationship between the exhaust gas pressure and the exhaust gas temperature in the exhaust path 16 in time sequence. The waveforms shown in FIG. 7 represent the relationship between the exhaust gas velocity and the exhaust gas pressure when the shock wave is being accelerated as shown in FIG. 13C. FIG. 13A and FIG. 14A show the respective relationship immediately after the exhaust port is opened. FIG. 13B and FIG. 14B show the respective relationship immediately after the exhaust gas and the shock wave collide against each other downstream with respect to the branch section 21. FIG. 13C and FIG. 14C show the respective relationship when the shock wave is being accelerated in the divergent section 33. FIG. 13D and FIG. 14D show the respective relationship after the shock wave is accelerated.

The exhausting method for the internal combustion engine in this preferred embodiment is as follows.

1) The fuel is combusted in the combustion chamber 10. By opening the exhaust port 9a in the combustion chamber 10, the exhaust gas flows into the exhaust path 16 from the combustion chamber 10, and also the shock wave propagating in the exhaust path 16 at a higher velocity than the exhaust gas is generated. FIG. 13A shows the exhaust gas velocity and the exhaust gas pressure immediately after the exhaust port 9a is opened. As shown in FIG. 13A, when the exhaust port 9a is opened, the pressure of the exhaust gas in the vicinity of the exhaust port 9a becomes higher than the atmospheric pressure. FIG. 14A shows the exhaust gas pressure and the exhaust gas temperature immediately after the exhaust port 9a is opened. As shown in FIG. 14A, the temperature of the exhaust gas becomes very high by receiving the combustion heat.

2) The branch section 21 branches at least a portion of the shock wave propagating in the exhaust path 16, from the exhaust path 16. The reflecting section 21b of the branch section 21 reflects the branched shock wave. The reflected shock wave propagates in the branch section 21 and again in the exhaust path 16. The reflected shock wave collides against the exhaust gas flowing in the exhaust path 16, which increases the pressure of the exhaust gas. The flow path cross-sectional area of the exhaust path 16 is decreased in the convergent section 32, which increases the pressure of the exhaust gas. Either the increase of the exhaust gas pressure caused by the collision of the shock wave and the exhaust gas, or the increase of the exhaust gas pressure caused by the decrease of the flow path cross-sectional area, may occur first. Specifically, the collision of the shock wave and the exhaust gas may occur before or after the exhaust gas pressure is increased in the convergent section 32. FIG. 13B shows the exhaust gas velocity and the exhaust gas pressure immediately after the exhaust gas pressure is increased. As shown in FIG. 13B, in the vicinity of the convergent section 32, the exhaust gas pressure is higher than that at the time of FIG. 13A. Upstream with respect to the convergent section 32, the exhaust gas velocity is higher than that at the time of FIG. 13A. FIG. 14B shows the exhaust gas pressure and the exhaust gas temperature immediately after the exhaust gas pressure is increased. As shown in FIG. 14B, the exhaust gas temperature is lower in the vicinity of the exhaust port 9a, but is higher upstream with respect to the convergent section 32, than that at the time of FIG. 14A.

3) The flow path cross-sectional area of the exhaust path 16 is increased in the divergent section 33 to decrease the exhaust gas pressure. When the exhaust gas pressure is decreased to be equal to or lower than the critical pressure ratio, a new shock wave propagating in the downstream direction in the exhaust path 16 is generated. When the shock wave is generated, an expansion wave progressing in the upstream direction is generated at the same time. The new shock wave is accelerated in the divergent section 33. Therefore, the fluid present in the space between the shock wave progressing in the downstream direction in the exhaust path 16 and the expansion wave progressing in the upstream direction in the exhaust path 16 expand rapidly. This can decrease the pressure of the exhaust gas flowing in the exhaust path 16. Thus, a region of a negative pressure can be generated in the exhaust path 16. At this point, the exhaust gas temperature can be decreased upstream with respect to the shock wave by an adiabatic cooling effect caused by adiabatic expansion. FIG. 13C shows the exhaust gas velocity and the exhaust gas pressure when the shock wave is being accelerated in the divergent section. As shown in FIG. 13C, the exhaust gas pressure is rapidly decreased from that at the time of FIG. 13B upstream with respect to the divergent section 33, to become a negative pressure. In accompaniment with this, the exhaust gas velocity upstream with respect to the divergent section 33 is rapidly increased. FIG. 14C shows the exhaust gas pressure and the exhaust gas temperature when the shock wave is being accelerated in the divergent section 33. As shown in FIG. 14C, in accompaniment with the decrease of the exhaust gas pressure upstream with respect to the divergent section 33, the exhaust gas temperature is rapidly decreased from that at the time of FIG. 14B.

FIG. 13D shows the exhaust gas velocity and the exhaust gas pressure after the shock wave is accelerated. As shown in FIG. 13D, the influence of the exhaust gas pressure, which is decreased upstream with respect to the divergent section 33 at the time of FIG. 13C, is exerted even on the exhaust port 9a upstream with respect to the convergent section 32. Therefore, the exhaust gas pressure becomes a negative pressure also in the vicinity of the exhaust port 9a. FIG. 14D shows the exhaust gas pressure and the exhaust gas temperature after the shock wave is accelerated. As shown in FIG. 14D, since the exhaust gas pressure becomes a negative pressure also in the vicinity of the exhaust port 9a, the exhaust gas temperature can also be significantly decreased in the vicinity of the exhaust port. This can also cool the exhaust valve 9 and suppress the deterioration thereof.

As shown in FIGS. 14A-14D, the exhaust gas temperature downstream with respect to the divergent section 33 does not change much. In other words, since the exhaust gas of a high temperature in the vicinity of the exhaust port 9a shown in FIG. 14A is cooled by an adiabatic cooling effect in the divergent section 33, the exhaust gas temperature downstream with respect to the divergent section 33 can be prevented from being changed.

In the example shown in FIGS. 13A-13D and FIGS. 14A-14D, the first catalyst 17 and the second catalyst 18 are provided downstream with respect to the divergent section 33. Since the exhaust gas temperature downstream with respect to the divergent section 33 can be prevented from being changed as described above, the temperature of the exhaust gas passing the first catalyst 17 and the second catalyst can be prevented from becoming excessively high. This can prevent sintering of the catalysts even where the internal combustion engine 1 is driven at a high load or in a high rotational speed range.

Where a secondary air supply path for supplying secondary air to a region in which a negative pressure is generated is connected, the secondary air can be supplied to the exhaust path. Specifically, as shown in FIG. 13C and FIG. 13D, after the shock wave 35b is accelerated, a negative pressure region is generated upstream with respect to the divergent section 33. Therefore, by connecting the secondary air supply path upstream with respect to the divergent section 33, secondary air can be supplied to the exhaust path 16.

Other Preferred Embodiments

There are no limitations on the applications of the internal combustion engine according to preferred embodiments of the present invention. The internal combustion engine according to various preferred embodiments of the present invention may be applied to, for example, a vehicle such as a motorcycle or an outboard motor mounted on a marine vessel. The present invention is applicable for any of various types of internal combustion engines.

Figure 15:
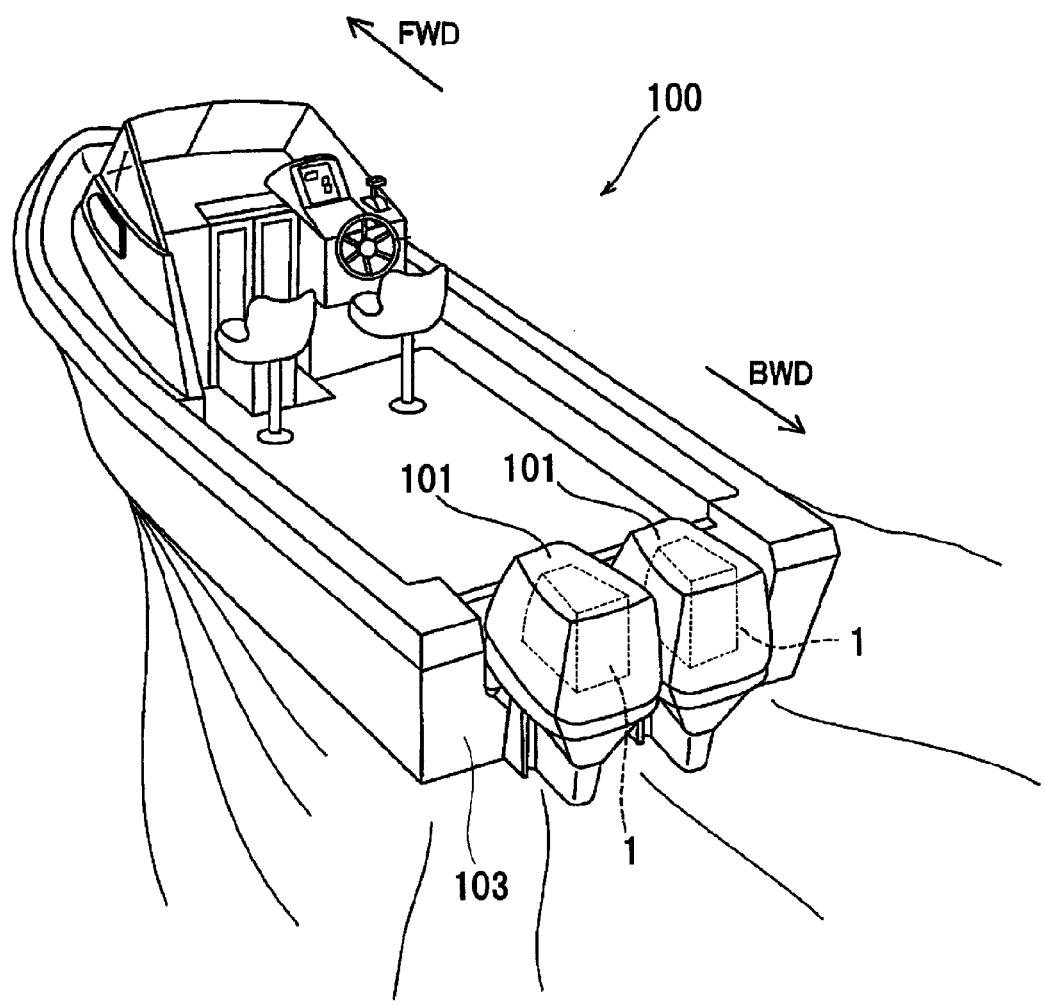
FIG. 15 shows an example of a marine vessel including an outboard motor having an internal combustion engine mounted thereon.
Figure 16:
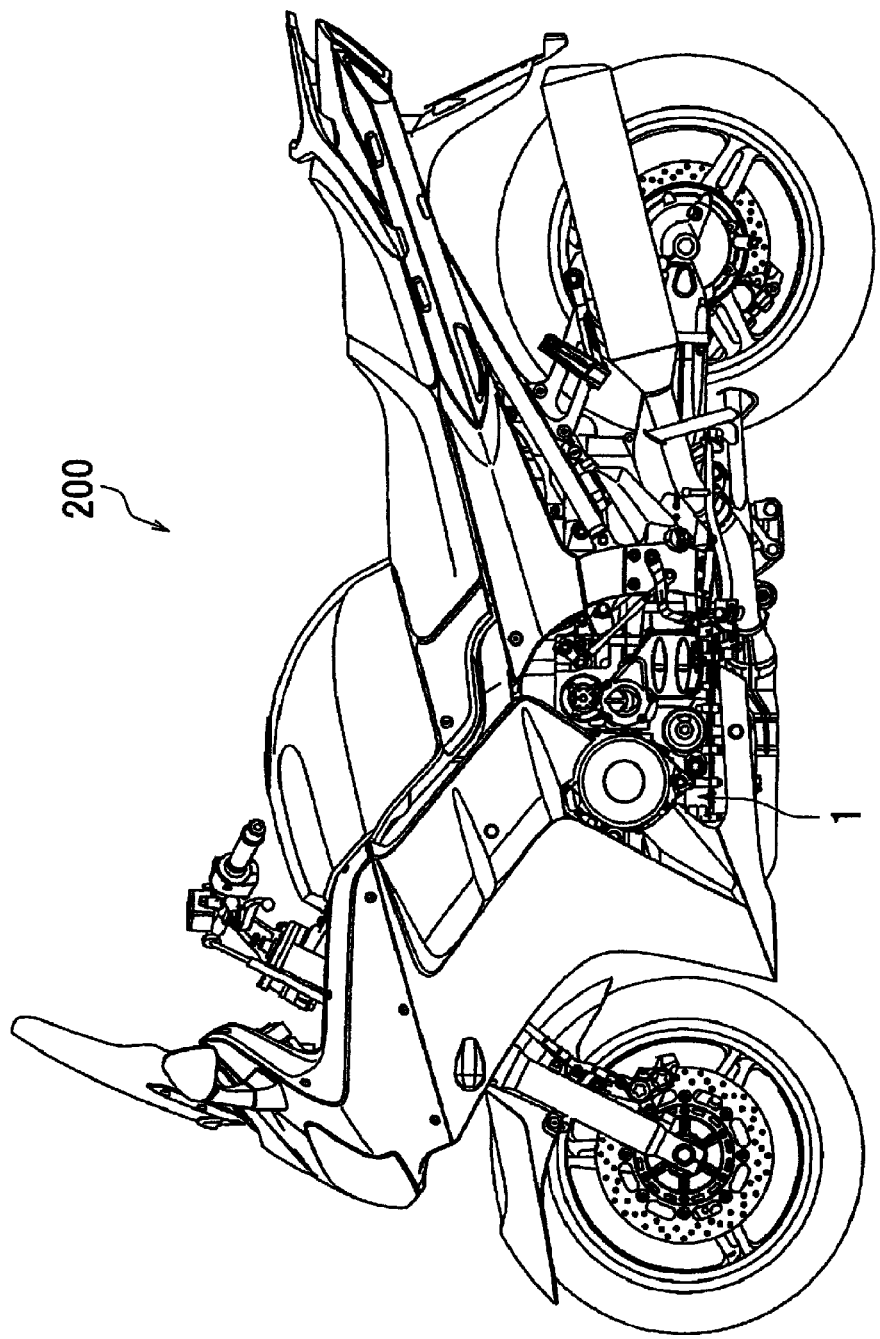
FIG. 16 shows an example of a motorcycle having an internal combustion engine mounted thereon.

FIG. 15 shows a marine vessel having an internal combustion engine according to a preferred embodiment of the present invention mounted thereon. Specifically, FIG. 15 shows a marine vessel 100 including two outboard motors 101 each having an internal combustion engine 1 according to a preferred embodiment of the present invention mounted thereon. The outboard motors 101 are attached to a stern 103 of the marine vessel 100 and can drive the marine vessel forward. An exhaust path of each outboard motor 101 is provided below the water surface, and the exhaust gas is discharged from the exhaust path into the water. FIG. 16 shows a vehicle having an internal combustion engine according to a preferred embodiment of the present invention mounted thereon. Specifically, FIG. 16 shows a motorcycle 200 including an internal combustion engine 1 located at the center of the body thereof. There is no limitation on the application of the internal combustion engine according to preferred embodiments of the present invention.

The internal combustion engine 1 in each of the above preferred embodiments preferably includes one exhaust device 5 for one combustion chamber 10, for example. Alternatively, a plurality of exhaust devices 5 may be provided for one combustion chamber 10. The internal combustion engine according to various preferred embodiments of the present invention may be a multi-cylinder engine as long as the divergent section is connected to only one combustion chamber upstream with respect to the divergent section. For example, in the case of a two-cylinder engine, each cylinder may have a separate exhaust path, and the branch section arranged to reflect the shock wave and the divergent section may be provided in each cylinder. Even in the case of a three- or larger number-cylinder engine, each cylinder may have a separate exhaust path, and the branch section to reflect the shock wave and the divergent section may be provided in each cylinder similarly. Owing to such a structure, even in a multi-cylinder engine, the exhaust gas pressure can be decreased upstream with respect to the divergent section of each exhaust path without being influenced by the exhaust gas from the other cylinders.

In Preferred Embodiment 1, by accelerating the shock wave in the convergent-divergent nozzle, a negative pressure is generated upstream with respect to the shock wave, and the pressure of the exhaust gas, and thus the temperature of the exhaust gas, can be decreased by an adiabatic cooling effect caused by adiabatic expansion. In Preferred Embodiment 1, the convergent section and the divergent section have therebetween a portion having a constant flow path cross-sectional area. By setting the length of the portion having a constant flow path cross-sectional area between the convergent section and the divergent section in accordance with the internal combustion engine, the timing at which the shock wave is to be accelerated in the divergent section, in other words, the timing at which the exhaust gas pressure and temperature are to be decreased, can be set in accordance with the internal combustion engine.

In Preferred Embodiment 2, an air path arranged to supply secondary air to the exhaust path is provided. Therefore, the secondary air can be efficiently supplied to the exhaust path using the negative pressure generated upstream with respect to the shock wave. This can efficiently decrease the exhaust gas temperature. In the case where a catalyst is located downstream with respect to the convergent-divergent nozzle, the temperature of the exhaust gas passing the catalyst can be decreased. This can, for example, prevent the sintering of the catalyst.

In Preferred Embodiment 3, air is supplied to the branch section 21. Therefore, a path acting exclusively as the branch section 21 is not provided. For this reason, as compared to Preferred Embodiment 1 and Preferred Embodiment 2 in which the dedicated branch section 21 is used, the costs are reduced and the degree of freedom of layout can be improved.

In Preferred Embodiment 4, a new shock wave can be generated by a simpler structure.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An internal combustion engine comprising: a combustion chamber including an exhaust port; an exhaust valve arranged to open and close the exhaust port; and an exhaust device including:
    an exhaust path arranged to guide exhaust gas discharged from the combustion chamber via the exhaust port;
    a convergent section including a flow path cross-sectional area that is smaller at a downstream end thereof than at an upstream end thereof;
    a divergent section provided downstream with respect to the convergent section and including a flow path cross-sectional area that is larger at a downstream end thereof than at an upstream end thereof; and
    a branch section arranged to branch a shock wave generated by the exhaust gas discharged from the combustion chamber, propagating in a downstream direction in the exhaust path at a higher velocity than the exhaust gas that generated the shock wave flowing into the exhaust path from the combustion chamber when the exhaust valve is opened, from a portion of the exhaust path which is upstream with respect to the divergent section, and to propagate the branched shock wave back to the exhaust path; wherein
    the divergent section is connected to the combustion chamber provided upstream with respect to the divergent section;
    the exhaust gas flowing into the exhaust path from the combustion chamber is caused to pass the convergent section and to collide against the shock wave generated by the exhaust gas which has propagated in the branch section, between the branch section and the divergent section, so as to increase the pressure of the exhaust gas in the convergent section; and
    the exhaust gas is caused to pass the divergent section to generate a new shock wave, and a negative pressure is generated upstream with respect to the divergent section in the exhaust path by the generated new shock wave.

2. An internal combustion engine comprising: a combustion chamber including an exhaust port; an exhaust valve arranged to open or close the exhaust port; and an exhaust device including:
    an exhaust path arranged to guide exhaust gas discharged from the combustion chamber via the exhaust port;
    a convergent section including a flow path cross-sectional area that is smaller at a downstream end thereof than at an upstream end thereof;
    a divergent section provided downstream with respect to the convergent section and including a flow path cross-sectional area that is larger at a downstream end thereof than at an upstream end thereof; and
    a branch section branched from a portion of the exhaust path which is upstream with respect to the divergent section and including a reflecting section arranged to reflect a shock wave generated by the exhaust gas discharged from the combustion chamber; wherein
    the divergent section is connected to the combustion chamber provided upstream with respect to the divergent section;
    where a velocity of the exhaust gas discharged from the combustion chamber when the exhaust valve is opened is $V_e$ and a propagation velocity of the shock wave propagating in the exhaust path is $V_s$, a distance $L_e$ between the exhaust port and an entrance of the branch section and a distance $L_s$ between the entrance of the branch section and the reflecting section fulfill a relationship of:

$L_e/V_e$ $(L_e+2L_s)/V_s$; and where a time from when the exhaust port is opened until the exhaust port is closed is $t_v$, a distance $L_d$ between the entrance of the branch section and the divergent section fulfills a relationship of:

$(L_e+2L_s+L_d)/V_s$ $t_v+(L_e+L_d)/V_e$.

3. The internal combustion engine according to claim 1, wherein the exhaust path further includes a portion including a constant flow path cross-sectional area between the convergent section and the divergent section.

4. The internal combustion engine according to claim 2, wherein the exhaust path further includes a portion including a constant flow path cross-sectional area between the convergent section and the divergent section.

5. An exhausting method for an internal combustion engine, the method comprising the steps of:
combusting fuel in a combustion chamber;
opening an exhaust port of the combustion chamber to discharge exhaust gas from the combustion chamber to an exhaust path and to generate a shock wave propagating in the exhaust path at a higher velocity than the exhaust gas;
branching at least a portion of the shock wave from the exhaust path and propagating the branched shock wave back to the exhaust path to cause the shock wave to collide against the exhaust gas that generated the shock wave so as to increase the pressure of the exhaust gas;
causing the exhaust gas to flow into a portion of the exhaust path having a smaller flow path cross-sectional area in a downstream section thereof than in an upstream section thereof so as to increase the pressure of the exhaust gas;
causing the exhaust gas to flow into a portion of the exhaust path having a larger flow path cross-sectional area in a downstream section thereof than in an upstream section thereof so as to generate a new shock wave propagating in a downstream direction in the exhaust path to generate a region of a negative pressure in the exhaust path; and
connecting the portion of the exhaust path having the larger flow path cross-sectional area in the downstream section thereof than in the upstream section to the combustion chamber and to no other combustion chamber.

6. A vehicle comprising the internal combustion engine according to claim 1.

7. A marine vessel comprising the internal combustion engine according to claim 1.

8. A method of operating an internal combustion engine, the method comprising the steps of:
operating the internal combustion engine; and
exhausting gas from the internal combustion engine including the steps of:
combusting fuel in a combustion chamber;
opening an exhaust port of the combustion chamber to discharge exhaust gas from the combustion chamber to an exhaust path and to generate a shock wave propagating in the exhaust path at a higher velocity than the exhaust gas;
branching at least a portion of the shock wave from the exhaust path and propagating the branched shock wave back to the exhaust path to cause the shock wave to collide against the exhaust gas that generated the shock wave so as to increase the pressure of the exhaust gas;
causing the exhaust gas to flow into a portion of the exhaust path having a smaller flow path cross-sectional area in a downstream section thereof than in an upstream section thereof so as to increase the pressure of the exhaust gas; and
causing the exhaust gas to flow into a portion of the exhaust path having a larger flow path cross-sectional area in a downstream section thereof than in an upstream section thereof so as to generate a new shock wave propagating in a downstream direction in the exhaust path to generate a region of a negative pressure in the exhaust path; and
connecting the portion of the exhaust path having the larger flow path cross-sectional area in the downstream section thereof than in the upstream section to the combustion chamber and to no other combustion chamber.

9. The internal combustion engine according to claim 1, wherein the convergent section has a pressure P0, the divergent section has a pressure P, and a pressure ratio P/P0 is smaller than a critical pressure ratio of about 0.528.

10. The internal combustion engine according to claim 2, wherein the convergent section has a pressure P0, the divergent section has a pressure P, and a pressure ratio P/P0 is smaller than a critical pressure ratio of about 0.528.

* * * * *